(12) United States Patent
Singh et al.

(10) Patent No.: US 9,561,968 B2
(45) Date of Patent: Feb. 7, 2017

(54) METHODS AND SYSTEMS FOR PRODUCING AND PROCESSING SYNGAS IN A PRESSURE SWING ADSORPTION UNIT AND MAKING AMMONIA THEREFROM

(71) Applicant: Kellogg Brown & Root LLC, Houston, TX (US)

(72) Inventors: Shashi Prakash Singh, Missouri City, TX (US); Akhil Jain Nahar, Delhi (IN); Stephen Allen Noe, Tomball, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 316 days.

(21) Appl. No.: 14/452,463

(22) Filed: Aug. 5, 2014

(65) Prior Publication Data

US 2015/0044120 A1 Feb. 12, 2015

Related U.S. Application Data

(60) Provisional application No. 61/863,281, filed on Aug. 7, 2013.

(51) Int. Cl.
*C01C 1/04* (2006.01)
*C01B 3/02* (2006.01)
(Continued)

(52) U.S. Cl.
CPC .............. *C01C 1/0458* (2013.01); *B01J 19/00* (2013.01); *C01B 3/025* (2013.01); *C01B 3/12* (2013.01); *C01B 3/38* (2013.01); *C01C 1/04* (2013.01); *C01C 1/0405* (2013.01); *C01B 2203/0233* (2013.01); *C01B 2203/0283* (2013.01); *C01B 2203/043* (2013.01); *C01B 2203/047* (2013.01);
(Continued)

(58) Field of Classification Search
CPC ........................................................ C01C 1/04
See application file for complete search history.

(56) References Cited

U.S. PATENT DOCUMENTS 4,194,890 A 3/1980 McCombs et al.
4,263,018 A 4/1981 McCombs et al.
(Continued)

OTHER PUBLICATIONS

Air Products, Pressure-Swing Adsorption for CO2 Capture from Sour Syngas, 2010, pp. 1-2, Air Products and Chemicals, Inc.
(Continued)

*Primary Examiner* — Wayne Langel
(74) *Attorney, Agent, or Firm* — Gary Machetta

(57) ABSTRACT

Methods and systems for making ammonia are provided. The method can include converting carbon monoxide in a first syngas to carbon dioxide to produce a shifted syngas. At least a portion of the carbon dioxide can be separated from the shifted syngas to produce a carbon dioxide-lean syngas. Carbon monoxide and/or carbon dioxide in the carbon dioxide-lean syngas can be converted to methane to produce a methanated first syngas. A second syngas can be separated to produce a purified second syngas and a waste gas. The methanated first syngas and the purified second syngas can be combined to produce an ammonia feedstock. The ammonia feedstock can have a hydrogen to nitrogen molar ratio of about 3.5:1 to about 2.5:1. At least a portion of the hydrogen and nitrogen in the ammonia feedstock can be reacted to produce an ammonia product.

14 Claims, 4 Drawing Sheets

(51) Int. Cl.
 *B01J 19/00* (2006.01)
 *C01B 3/12* (2006.01)
 *C01B 3/38* (2006.01)

(52) U.S. Cl.
 CPC ............... *C01B 2203/0445* (2013.01); *C01B 2203/0475* (2013.01); *C01B 2203/068* (2013.01); *C01B 2203/141* (2013.01); *C01B 2203/142* (2013.01); *C01B 2203/143* (2013.01); *C01B 2203/146* (2013.01); *Y02P 20/132* (2015.11); *Y02P 20/52* (2015.11)

(56) References Cited

U.S. PATENT DOCUMENTS

| | | | |
|---|---|---|---|
| 4,296,085 A * | 10/1981 | Banquy | C01B 3/025 252/373 |
| 4,376,758 A * | 3/1983 | Pagani | C01B 3/025 203/75 |
| 4,636,334 A * | 1/1987 | Skinner | C01B 3/025 252/377 |
| 5,011,625 A | 4/1991 | LeBlanc | |
| 5,122,299 A | 6/1992 | LeBlanc | |
| 5,362,454 A | 11/1994 | Cizmer et al. | |
| 5,736,116 A | 4/1998 | LeBlanc et al. | |
| 6,333,014 B1 * | 12/2001 | Filippi | B01J 3/00 422/170 |
| 7,550,215 B2 | 6/2009 | Malhotra et al. | |
| 7,867,460 B2 | 1/2011 | Singh et al. | |
| 7,867,465 B2 | 1/2011 | Blanchard | |
| 7,955,496 B2 | 6/2011 | Iqbal et al. | |
| 8,591,770 B2 * | 11/2013 | Filippi | C01B 3/02 252/374 |
| 8,617,270 B2 | 12/2013 | Haque | |
| 9,156,689 B2 * | 10/2015 | Knudsen | C01B 3/382 |
| 2011/0206594 A1 * | 8/2011 | Singh | C01B 3/025 423/361 |
| 2012/0195817 A1 * | 8/2012 | Singh | C01B 3/025 423/360 |
| 2014/0120023 A1 * | 5/2014 | Singh | B01J 14/00 423/359 |
| 2014/0364647 A1 * | 12/2014 | Iaquaniello | C01B 3/025 564/69 |
| 2015/0151272 A1 * | 6/2015 | Filippi | C01B 3/025 29/401.1 |

OTHER PUBLICATIONS

Shashi Singh, New KBR Ammonia Synthesis Loop Revamp Technology Improves Plant Energy Efficiency, Nitrogen & Syngas Conference, Feb. 2009, pp. 1-8, KBR, Houston, Texas, USA.
KBR Technology, Ammonia Revamp—How in Your World, 2011, pp. 1-7, KBR.

* cited by examiner

METHODS AND SYSTEMS FOR PRODUCING AND PROCESSING SYNGAS IN A PRESSURE SWING ADSORPTION UNIT AND MAKING AMMONIA THEREFROM

This application claims priority to U.S. Provisional patent application having Ser. No. 61/863,281, filed on Aug. 7, 2013, which is incorporated by reference herein in its entirety. Embodiments disclosed generally relate to methods and systems for ammonia. More particularly, such embodiments relate to methods and systems for producing purified syngas and making ammonia therefrom.

BACKGROUND

Field

A hydrocarbon feed is usually reformed in a primary steam methane reformer and a secondary reformer such as an autothermal reformer to produce a raw syngas. In more recent systems, the syngas leaving the secondary reformer is further reformed in a reforming exchanger to produce the raw syngas. The raw syngas is then purified in a system that typically includes one or more gas shift converters, one or more carbon dioxide removal units, and one or more methanators to produce a purified syngas.

Description of the Related Art

An ideal syngas for the synthesis of ammonia will have a molar ratio of 3 moles of hydrogen to 1 mole of nitrogen. Traditional ammonia synthesis systems continue to struggle to produce a syngas with this desired hydrogen to nitrogen molar ratio while simultaneously increasing ammonia production capacity. One attempt to increase plant capacity includes replacing existing units with units having a larger capacity, which requires large upfront investment and plant shut down time.

DETAILED DESCRIPTION

Methods and systems for making ammonia are provided. In one or more embodiments, the method can include converting a first syngas that can include carbon dioxide and about 8 mol % to about 20 mol % carbon monoxide to produce a shifted syngas that can include carbon dioxide and about 0.1 mol % to about 1 mol % carbon monoxide. At least a portion of the carbon dioxide can be separated from the shifted syngas to produce a carbon dioxide-lean syngas. At least a portion of the carbon monoxide, carbon dioxide, or both in the carbon dioxide-lean syngas can be converted to methane to produce a methanated first syngas. The methanated first syngas can have a hydrogen to nitrogen molar ratio ($H_2:N_2$) of about 1.5:1 to about 3.5:1. A second syngas that can include carbon dioxide and about 7 mol % to about 20 mol % carbon monoxide can be separated to produce a purified second syngas and a waste gas. The purified second syngas can have a hydrogen to nitrogen molar ratio of about 2:1 to about 50:1. The waste gas can have a carbon monoxide concentration of about 0.2 mol % to about 60 mol %. At least a portion of the methanated first syngas and at least a portion of the purified second syngas can be combined to produce an ammonia feedstock. The ammonia feedstock can have a hydrogen to nitrogen molar ratio of about 2.5:1 to about 3.5:1. At least a portion of the hydrogen and nitrogen in the ammonia feedstock can be reacted to produce an ammonia product.

Figure 1:
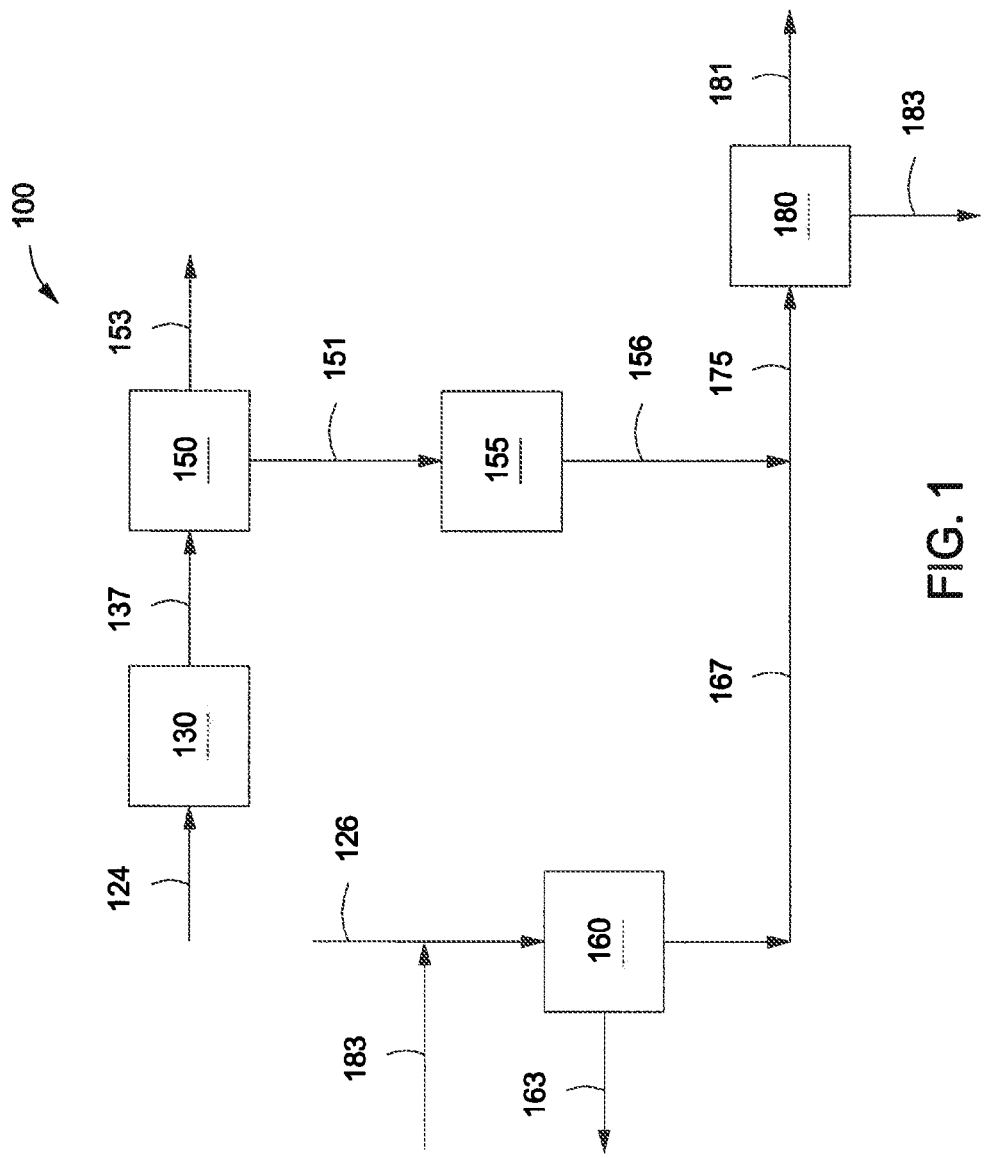
FIG. 1 depicts a schematic of an illustrative system for purifying syngas and producing ammonia, according to one or more embodiments described.

FIG. 1 depicts a schematic of an illustrative system 100 for purifying syngas and producing ammonia, according to one or more embodiments. The system 100 can include a shift converter 130 configured to convert the carbon monoxide in a first syngas 124 to carbon dioxide, thereby producing a shifted first syngas via line 137. The shifted first syngas via line 137 can be introduced to a carbon dioxide removal unit 150 to remove at least a portion of the carbon dioxide contained therein to produce a carbon dioxide-lean first syngas via line 151 and a carbon dioxide product via line 153. The carbon dioxide-lean first syngas via line 151 can be introduced to a methanator 155 to produce a methanated first syngas via line 156. The system 100 can also include a pressure swing adsorption unit 160 configured to purify a second syngas in line 126 to produce a purified second syngas via line 167. The methanated first syngas via line 156 and the purified second syngas via line 167 can be combined to produce an ammonia feed stock via line 175. At least a portion of the nitrogen and hydrogen contained in the ammonia feed stock in line 175 can be reacted in an ammonia synthesis unit 180 to produce an ammonia product via line 181 and a purge gas via line 183.

The first syngas in line 124 and the second syngas in line 126 can be processed to produce the ammonia feedstock in line 175. The first syngas in line 124 can have a hydrogen to nitrogen molar ratio of about 1:1 to about 3.5:1, about 1.3:1 to about 3.2:1, or about 2:1 to about 3:1 and the second syngas in line 126 can have a hydrogen to nitrogen molar ratio of about 1:1 to about 3.5:1, about 1.3:1 to about 3.2:1, or about 2:1 to about 3:1. The first and second syngas can be a mixture containing primarily hydrogen and carbon monoxide with a smaller amount of carbon dioxide.

The first syngas via line 124 can be introduced to a first shift converter 130 to convert at least a portion of the carbon monoxide present in the first syngas to carbon dioxide, thereby producing the shifted first syngas via line 137. The shifted first syngas in line 137 can have a carbon monoxide concentration of about 0.1 mol %, about 0.3 mol %, or about 0.5 mol % to about 0.8 mol %, about 1 mol %, or about 1.2 mol %. For example, the shifted first syngas in line 137 can have a carbon monoxide concentration of about 0.1 mol % to about 1 mol % or about 0.3 mol % to about 0.7 mol %. All concentrations presented herein as "mol %" should be considered on a dry basis, e.g., "mol % dry basis," unless otherwise indicated. The shift converter 130 can include, but is not limited to, single stage adiabatic fixed bed reactors, multiple-stage adiabatic fixed bed reactors with interstage cooling, steam generation, and/or cold quench reactors, tubular fixed bed reactors with steam generation and/or cooling, fluidized bed reactors, or any combination thereof.

The shifted first syngas via line 137 can be introduced to one or more carbon dioxide removal units 150 to remove at least a portion of the carbon dioxide contained therein to produce a carbon dioxide-lean first syngas via line 151 and a carbon dioxide product via line 153. For example, the carbon dioxide-lean first syngas in line 151 can have a carbon dioxide concentration of less than 1.1 mol %, less than 1 mol %, less than 0.7 mol %, less than 0.5 mol %, less than 0.3 mol %, less than 0.1 mol %, less than 0.05 mol %, or less than 0.01 mol %. The carbon dioxide removal unit 150 can include any one or any combination of physical, mechanical, electrical and/or chemical systems configured in series, parallel, or any combination thereof. The carbon dioxide removal unit 150 can include one or more physical separation systems including, but not limited to, membrane type systems and/or solvent based systems. The carbon dioxide removal unit 150 can include one or more absorption/desorption type, solvent-based systems.

The carbon dioxide-lean first syngas 151 can be introduced to the one or more methanators 155 to produce the methanated first syngas via line 156. The methanator 155 can convert at least a portion of the carbon monoxide and/or carbon dioxide contained in the first syngas to methane and water. The methanated first syngas in line 156 can have a hydrogen to nitrogen molar ratio of about 1.5:1 to about 3.5:1, about 2:1 to about 3.5:1, or about 1.5:1 to about 2.8:1. The methanated first syngas in line 156 can have a methane concentration of about 0.5 mol %, about 0.6 mol %, about 0.7 mol %, about 0.9 mol %, or about 1 mol % to about 1.1 mol %, about 1.2 mol %, about 1.4 mol %, about 1.6 mol %, about 1.8 mol %, or about 2 mol %.

The second syngas via line 126 can be introduced to one or more pressure swing absorption ("PSA") units 160 to produce the purified second syngas via line 167 and a waste gas via line 163. The PSA unit 160 can remove at least a portion of the water, carbon dioxide, carbon monoxide, argon, nitrogen, methane, or any combination thereof present in the second syngas to produce the purified second syngas via line 167. The purified second syngas in line 167 can have an increased concentration of hydrogen relative to the second syngas in line 126. For example, the hydrogen to nitrogen molar ratio of the purified second syngas in line 167 can be at least 2.5:1, at least 3:1, at least 3.8:1, at least 4.3:1, at least 6.3:1, at least 10.2:1, at least 13:1, or at least 50:1. In another example, the hydrogen to nitrogen molar ratio of the purified second syngas in line 167 of from about 2.5:1, about 3:1, about 3.3:1, about 3.5:1, about 3.7:1, about 4:1, about 4.3:1, about 4.5:1, about 4.7:1, or about 5:1 to about 10:1, about 15:1, about 20:1, about 25:1, about 30:1, about 35:1, about 40:1, or about 50:1. In another example, the removal of excess nitrogen can produce a purified second syngas via line 167 with a hydrogen to nitrogen molar ratio exceeding 3:1.

The PSA unit 160 can utilize one or more gas separation technologies including, but not limited to, pressure swing absorption, pressure swing adsorption, or a combination thereof. Suitable absorbents can include caustic soda, potassium carbonate or other inorganic bases, and/or alkanolamines. In the PSA unit 160, the syngas can be passed through or otherwise contacted with an adsorbent filled bed where selective components of the syngas can be adsorbed and/or absorbed in the bed. In one or more embodiments, the PSA unit 160 can include one or more adsorption beds. The syngas can be introduced to a first bed until the adsorbent in the first bed becomes saturated, at which point the syngas can be introduced to a second bed while the adsorbent in the first bed can be regenerated. Once the first bed has been regenerated, the syngas can again be introduced to the first bed and the second bed can be regenerated. This process can be repeated, allowing the PSA unit 160 to separate the syngas in a substantially continuous manner, requiring little to no shut-down time during regeneration of the adsorption/absorption beds.

The methanated first syngas in line 156 and the purified second syngas in line 167 can be introduced to an ammonia synthesis unit 180 to produce an ammonia product via line 181 and a purge gas via line 183. For example, at least a portion of the methanated first syngas in line 156 and at least a portion of the purified second syngas in line 167 can be combined or mixed with one another in one or more lines, conduits, pipes, tubes, ducts, spouts, flow paths, channels, vessels, or any combination thereof to produce the ammonia feedstock via line 175 prior to being introduced to the ammonia synthesis unit 180. In another example, at least a portion of the methanated first syngas in line 156 and at least a portion of the purified second syngas in line 167 can be introduced separately to the ammonia synthesis unit 180. The ammonia synthesis unit 180 can include one or more ammonia converters and one or more ammonia condensers (not shown). At least a portion of the nitrogen and hydrogen present in the ammonia feedstock in line 175 can reacted with one another to produce an ammonia product via line 181.

The methanated first syngas 156 can have a hydrogen to nitrogen molar ratio of less than 3:1 and the purified second syngas 167 can have a hydrogen to nitrogen molar ratio greater than 3:1. Combining the methanated first syngas in line 156 and the purified second syngas in line 167 can produce the ammonia feedstock via line 175 that can have a hydrogen to nitrogen molar ratio of from about 2:1, about 2.3:1, about 2.5:1, about 2.7:1, or about 2.9:1 to about 3.1:1, about 3.2:1, about 3.3:3, about 3.4:1, or about 3.5:1. For example, the ammonia feedstock in line 175 can have a hydrogen to nitrogen molar ratio of about 2:1 to about 3.5:1, about 2.5:1 to about 3.3:1, or about 2.85:1 to about 3.1:1.

The ammonia synthesis unit 180 can be or include one or more conventional single or multi-pass converters that include one or more magnetite catalysts. The ammonia synthesis unit 180 can be or include single or multi-pass converters that include one or more noble metal catalysts or noble metal including catalysts such as a ruthenium-based catalyst. An illustrative ruthenium-based catalyst can include the KAAP catalyst available from KBR, Inc.

The ammonia synthesis unit 180 can include an ammonia condenser that can include any mechanical or chemical system capable of selectively separating ammonia from a gas mixture including at least one of hydrogen and nitrogen. The ammonia condenser can include one or more cryogenic purifiers containing one or more refrigeration exchangers and one or more refrigeration compressors.

The ammonia synthesis unit 180 can also include any reactor intended to operate at elevated pressures and/or temperatures to convert at least a portion of a feed gas containing nitrogen and hydrogen, e.g., the compressed syngas in line 175, to ammonia. The ammonia synthesis unit 180 can include one or more "Split-Flow Ammonia Converters," as discussed and described in U.S. Pat. No. 7,081,230. The ammonia synthesis unit 180 can include one or more "Isothermal Ammonia Converters," as discussed and described in U.S. Pat. No. 6,171,570. The ammonia synthesis unit 180 can include one or more "Horizontal Ammonia Converter Adapted for High Activity Catalyst," as discussed and described in U.S. Pat. No. 6,132,687. The ammonia synthesis unit 180 can include one or more ammonia converters as discussed and described in U.S. Pat. No. 7,867,460.

The purge gas 183 can be introduced to an argon recovery unit (not shown) to produce an argon-rich product and an argon-lean purge gas. The purge gas 183 can be introduced to a purge gas recovery unit (not shown) to produce a hydrogen-rich product that can be recycled within the ammonia synthesis unit 180. The purge gas via line 183 can be recycled to one or more feeds in the system 100. Separated or recovered argon can be vented to the atmosphere, sold as a by-product, or otherwise disposed. The argon recovery unit can be eliminated and the purge gas via line 183 can be introduced to the second syngas in line 126.

Although not shown, the system 100 can include a system for heat recovery, or steam network, to increase efficiency. The "Steam Network" process conditions and other details can be found in U.S. Patent Application Publication No.: 2011/0042620.

Figure 2:
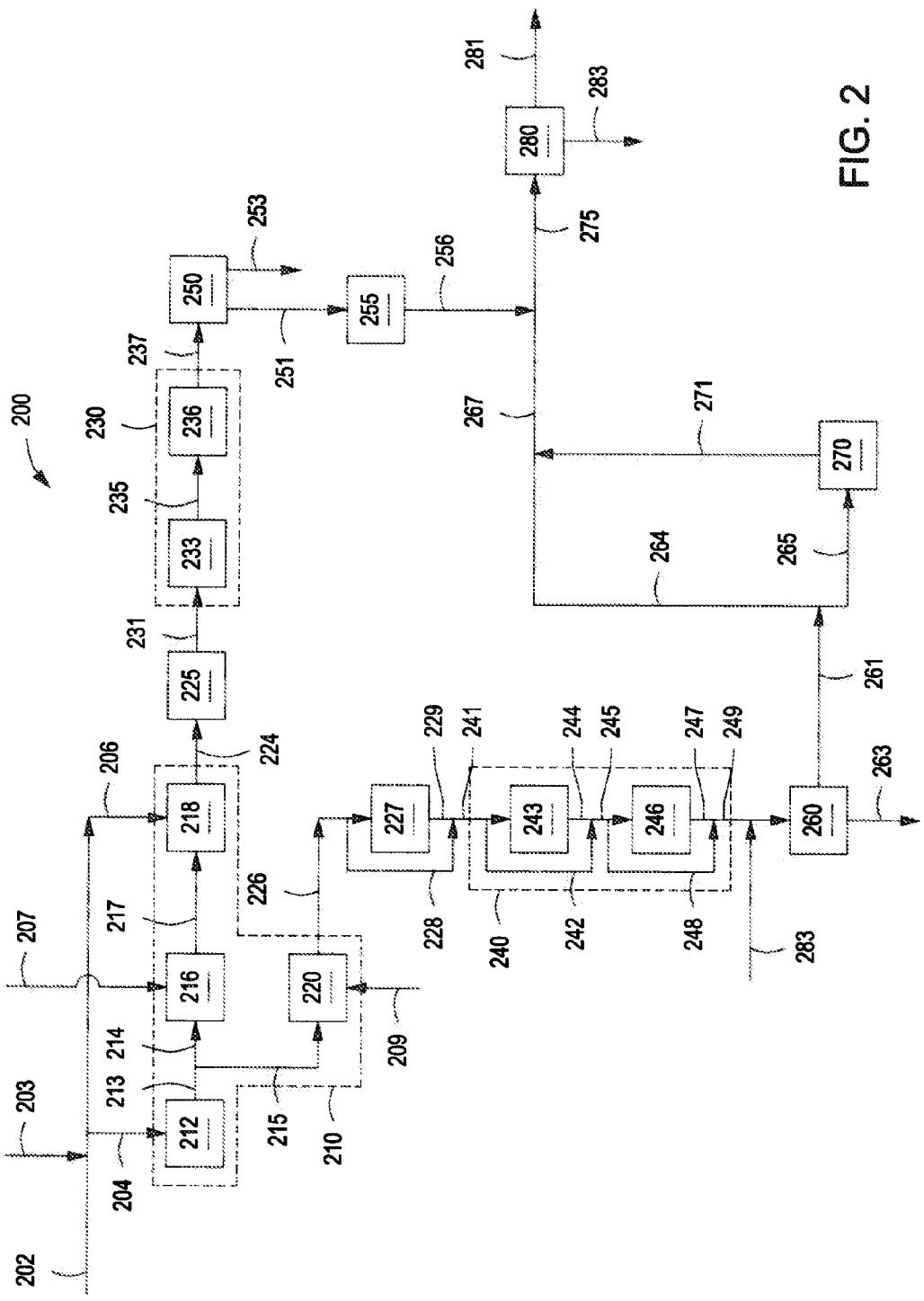
FIG. 2 depicts a schematic of another illustrative system for producing syngas, according to one or more embodiments described.

FIG. 2 depicts a schematic of an illustrative system 200 for producing syngas, according to one or more embodiments. The system 200 can include one or more pressure swing adsorption units 260 to increase the hydrogen concentration of the syngas via line 261. The system 200 can also include one or more primary reformers 212, one or more secondary reformers (two are shown) 216, 220, and one or more reforming exchangers 218. The primary reformer 212, secondary reformers 216 and 220, and the reforming exchanger 218 can be collectively referred to as a reforming system 210.

One or more hydrocarbons 202 can be divided, apportioned, split, or otherwise separated into a first hydrocarbon 204 and a second hydrocarbon 206. Although not shown, the first hydrocarbon 204 and the second hydrocarbon 206 can be provided from different sources. As such, the first hydrocarbon 204 and the second hydrocarbon 206 can have the same composition, substantially the same composition, or different compositions with respect to one another. The hydrocarbon 202, for example, can be transferred in one or more lines, conduits, pipes, tubes, vessels, ducts, spouts, flow paths, channels, or any combination thereof.

Steam via line 203 can be introduced to the hydrocarbon in line 202, the first hydrocarbon in line 204, and/or to the second hydrocarbon in line 206. The first hydrocarbon in line 204 and the second hydrocarbon in line 206 can have a steam to carbon molar ratio (or steam to carbon content of the first or second hydrocarbon) of from about 2.5:1, about 2.6:1, about 2.8:1, about 3:1, or about 3.3:1 to about 3.5:1, about 4:1, about 4.5:1, or about 5:1. Introducing the steam via line 203 to the first hydrocarbon and the second hydrocarbon can produce or allow for different steam to carbon molar ratios between the first hydrocarbon in line 204 and the second hydrocarbon in line 206. For example, the first hydrocarbon in line 204 can have a steam to carbon molar ratio of about 2.5:1 to about 4:1 and the second hydrocarbon in line 206 can have a steam to carbon molar ratio of from about 2.5:1 to about 5:1.

In one or more embodiments, hydrogen (not shown) can be introduced to the first hydrocarbon in line 204 and/or the second hydrocarbon in line 206. The hydrogen can be provided, produced, or otherwise obtained from any suitable source located within the system 200 or from outside the system 200, e.g., inside battery limits ("ISBL") or outside battery limits ("OSBL"). For example, at least a portion of the hydrogen that can be introduced to the hydrocarbon in line 202, the first hydrocarbon in line 204, and/or the second hydrocarbon in line 206 can be produced from one or more downstream purge gases.

The first hydrocarbon 204 can be or include from about 60 vol % to about 99 vol % or about 60 vol % to about 95 vol % of the total amount of the hydrocarbon in line 202. The second hydrocarbon 206 can be or include from about 1 vol % to about 40 vol % or about 5 vol % to about 40 vol % of the total amount of the hydrocarbon in line 202. For example, the first hydrocarbon in line 204 can be or include about 70 vol % to about 95 vol % of the total amount of the hydrocarbon 202 and the second hydrocarbon in line 206 can be or include from about 5 vol % to about 30 vol % of the total amount of the hydrocarbon 202. In another example, the amount of the first hydrocarbon in line 204 can be equal to the amount of the second hydrocarbon in line 206. In another example, the amount of the first hydrocarbon in line 204 can be up to about 2, about 5, about 7, about 10, about 12, about 15, about 17, or about 20 times more than the amount of the second hydrocarbon in line 206.

The hydrocarbon in line 202 can include one or more liquid or gaseous hydrocarbons, or any mixture thereof. In one or more embodiments, the hydrocarbon in line 202 can include hydrogen, nitrogen, methane, ethane, propane, butane, or any mixture thereof. The hydrocarbon in line 202 can have a hydrogen concentration of about 0 mol %, about 0.5 mol %, about 1 mol %, or about 1.5 mol % to about 2 mol %, about 4 mol %, about 10 mol %, or about 20 mol %. The hydrocarbon in line 202 can have a methane concentration of about 50 mol %, about 65 mol %, about 75 mol %, or about 85 mol % to about 88 mol %, about 93 mol %, about 97 mol %, or about 100 mol %. The hydrocarbon in line 202 can have a $C_2$-$C_3$ concentration of about 0 mol %, about 3 mol %, about 7 mol %, or about 9 mol % to about 12 mol %, about 17 mol %, about 20 mol %, or about 25 mol %. The hydrocarbon in line 202 can have a $C_4$ and higher concentration of about 0 mol %, about 1 mol %, about 2 mol %, or about 3 mol % to about 5 mol %, about 8 mol %, about 11 mol %, or about 15 mol %. In one or more embodiments, the hydrocarbon in line 202 can include about 1 mol % to about 2 mol % hydrogen, about 80 mol % to about 90 mol % methane, about 7 mol % to about 12 mol % $C_2$-$C_3$ hydrocarbons, and about 3 mol % to about 5 mol % of $C_4$ and higher hydrocarbons.

The first hydrocarbon in line 204 can have a hydrogen concentration of about 0 mol %, about 0.5 mol %, about 1 mol %, or about 1.5 mol % to about 5 mol %, about 9 mol %, about 16 mol %, or about 20 mol %. The first hydrocarbon in line 204 can have a methane concentration of about 50 mol %, about 60 mol %, about 70 mol %, or about 82 mol % to about 88 mol %, about 92 mol %, about 96 mol %, or about 100 mol %. The first hydrocarbon in line 204 can have a $C_2$-$C_3$ concentration of about 0 mol %, about 5 mol %, about 8 mol %, or about 10 mol % to about 15 mol %, about 18 mol %, about 22 mol %, or about 25 mol %. The first hydrocarbon in line 204 can have a C4 and higher concentration of about 0 mol %, about 1.1 mol %, about 2.5 mol %, or about 3.3 mol % to about 3.8 mol %, about 4.5 mol %, about 7 mol %, about 9 mol %, about 11 mol %, or about 15 mol %. In one or more embodiments, the first hydrocarbon in line 204 can include about 1 mol % to about 2 mol % hydrogen, about 80 mol % to about 90 mol % methane, about 7 mol % to about 12 mol % $C_2$-$C_3$ hydrocarbons, and about 3 mol % to about 5 mol % of $C_4$ and higher hydrocarbons.

The second hydrocarbon in line 206 can have a hydrogen concentration of about 0 mol %, about 0.5 mol %, about 1.2 mol %, or about 1.5 mol % to about 1.8 mol %, about 4 mol %, about 12 mol %, or about 20 mol %. The second hydrocarbon in line 206 can have a methane concentration of about 50 mol %, about 65 mol %, about 75 mol %, or about 80 mol % to about 85 mol %, about 90 mol %, about 96 mol %, or about 100 mol %. The second hydrocarbon in line 206 can have a $C_2$-$C_3$ concentration of about 0 mol %, about 3 mol %, 6 mol %, or about 10 mol % to about 14 mol %, about 18 mol %, about 21 mol %, or about 25 mol %. The second hydrocarbon in line 206 can have a $C_4$ and higher concentration of about 0 mol %, about 1.5 mol %, about 2.5 mol %, or about 3 mol % to about 3.7 mol %, about 7 mol %, about 9 mol %, about 11 mol %, or about 15 mol %. In one or more embodiments, the first hydrocarbon in line 204 can include about 1 mol % to about 2 mol % hydrogen, about 80 mol % to about 90 mol % methane, about 7 mol % to about 12 mol % $C_2$-$C_3$ hydrocarbons, and about 3 mol % to about 5 mol % of $C_4$ and higher hydrocarbons.

The first hydrocarbon in line 204 can be reformed in the presence of steam 203 in the primary reformer 212 to produce an effluent via 213. The first hydrocarbon in line 204 can be reformed in the presence of one or more first catalysts in the primary reformer 212 to produce the effluent via 213. The first hydrocarbon in line 204 can be reformed in the presence of steam 203 and one or more first catalysts in the primary reformer 212 to produce the effluent via line 213.

The effluent in line 213 can be divided, apportioned, split, or otherwise separated into a first effluent 214 and a second effluent 215. The first effluent in line 214 can be or include about 40 vol % to about 90 vol % of the effluent from line 213. For example, the first effluent in line 214 can be or include about 50 vol % to about 80 vol % of the effluent from line 213. The second effluent in line 215 can be or include about 10 vol % to about 60 vol % of the effluent from line 213. For example, the second effluent in line 215 can be or include about 20 vol % to about 50 vol % of the effluent from line 213.

The first effluent in line 214 can be or include hydrogen, carbon monoxide, carbon dioxide, methane, or any mixture thereof. The first effluent in line 214 can include an increased amount of hydrogen and a decreased amount of methane as compared to the first hydrocarbon in line 204. The first effluent in line 214 can have a hydrogen concentration of about 50 mol %, about 54 mol %, about 58 mol %, or about 62 mol % to about 66 mol %, about 69 mol %, about 71 mol %, or about 75 mol %. The first effluent in line 214 can have a methane concentration of about 7 mol %, about 9 mol %, about 13 mol %, or about 16 mol % to about 18 mol %, about 21 mol %, about 26 mol %, or about 30 mol %. The first effluent in line 214 can have a carbon monoxide concentration of about 3 mol %, about 4 mol %, about 5 mol %, or about 6 mol % to about 6.5 mol %, about 8.5 mol %, about 12 mol %, or about 15 mol %. The first effluent in line 214 can have a carbon dioxide concentration of about 8 mol %, about 10 mol %, about 11 mol %, or about 12 mol % to about 14 mol %, about 16 mol %, about 18 mol %, or about 20 mol %. The first effluent in line 214 can have components such as $C_2$ and heavier hydrocarbons being absent or minimally present, for example at less than about 1 mol %, less than about 0.5 mol %, or less than about 0.1 mol %. In one or more embodiments, the first effluent in line 214 can be or include about 60 mol % to about 70 mol % hydrogen, about 12 mol % to about 20 mol % methane, about 3 mol % to about 9 mol % carbon monoxide, and about 7 mol % to about 15 mol % carbon dioxide. In one or more embodiments, the first effluent in line 214 can be or include about 63 mol % to about 66 mol % hydrogen, about 16 mol % to about 18 mol % methane, about 5 mol % to about 7 mol % carbon monoxide, and about 10 mol % to about 12 mol % carbon dioxide.

The first effluent in line 214 can be at a temperature of about 650° C., about 685° C., about 725° C., about 750° C., or about 765° C. to about 775° C., about 815° C., about 835° C., or about 850° C. For example, the first effluent in line 214 can be at a temperature of about 730° C. to about 830° C., about 755° C. to about 815° C., or about 770° C. to about 820° C. The first effluent in line 214 can be at a pressure of about 2,000 kPa, about 2,600 kPa, about 3,100 kPa, or about 3,400 kPa to about 3,500 kPa, about 4,200 kPa, about 4,900 kPa, or about 5,500 kPa.

The first effluent in line 214 can be reformed in the presence of one or more second catalysts and one or more first oxidants 207 in a first secondary reformer 216 to produce a reformed effluent 217. For example, the first effluent 214 can be introduced to the first secondary reformer 216 which can be an autothermal reformer ("ATR"). The first oxidant, such as oxygen enriched air, can be introduced via line 207 to the first secondary reformer 216. The oxygen enriched air introduced via line 207 can be used to partially combust a portion of the first effluent introduced via line 214 to provide heat that drives an endothermic reforming reaction within one or more catalyst beds disposed within the first secondary reformer 216. Air, or heated air, introduced to the first secondary reformer 216 can be heated via the heating coil disposed in the exhaust duct of the primary reformer 212. The first secondary reformer 216 can be operated at a temperature of about 1,200° C., about 1,250° C., about 1,300° C., or about 1,400° C. to about 1,450° C., about 1,475° C., about 1,500° C., or about 1,550° C.

The oxygen enriched air can be provided from air introduced to an air absorption unit, which can separate at least a portion of the nitrogen and/or other components from the air to produce oxygen enriched air. The oxygen enriched air can contain about 21 vol % oxygen to about 40 vol % oxygen. Steam can be introduced to the first and second oxidants in lines 207, 209 (not shown) and/or to a preheated oxidant to produce an oxidant and steam mixture. Although not shown, steam can be introduced directly to the first secondary reformer 216 and second secondary reformer 220, rather than to the first and second oxidant in lines 207, 209 or the preheated oxidants.

The reformed effluent in line 217 can include hydrogen, carbon monoxide, carbon dioxide, nitrogen, and other minor components, such as argon and/or methane, or any mixture thereof. The reformed effluent in line 217 can have a hydrogen concentration of about 35 mol %, about 38 mol %, about 45 mol %, or about 48 mol % to about 54 mol %, about 60 mol %, about 65 mol %, or about 75 mol %. The reformed effluent in line 217 can have a methane concentration of about 0.05 mol %, about 0.07 mol %, about 0.09 mol %, or about 0.15 mol % to about 0.02 mol %, about 0.1 mol %, about 1 mol %, or about 2 mol %. The reformed effluent in line 217 can have a carbon monoxide concentration of about 7 mol %, about 8.5 mol %, about 10 mol %, or about 12 mol % to about 13.5 mol %, about 15 mol %, about 17 mol %, or about 20 mol %. The reformed effluent in line 217 can have a carbon dioxide concentration of about 4 mol %, about 5.5 mol %, about 6.5 mol %, or about 7 mol % to about 7.5 mol %, about 10 mol %, about 15 mol %, or about 20 mol %. The reformed effluent in line 217 can have an argon concentration of about 0.1 mol %, about 0.2 mol %, about 0.3 mol %, or about 0.4 mol % to about 0.5 mol %, about 0.6 mol %, about 0.7 mol %, or about 0.8 mol %.

The reformed effluent in line 217 can be at a temperature of about 800° C., about 900° C., about 950° C., or about 1,000° C. to about 1,065° C., about 1,100° C., about 1,125°

C., or about 1,150° C. The pressure of the reformed effluent in line 217 can range from about 2,000 kPa, about 2,500 kPa, about 3,000 kPa, or about 3,300 kPa to about 3,400 kPa, about 4,000 kPa, about 4,500 kPa, or about 5,500 kPa.

The second hydrocarbon in line 206 and/or the reformed effluent 217 can be further reformed in the reform exchanger 218 to produce a first syngas 224. The reforming exchanger can reform the second syngas 206 and/or the reformed effluent 217 at a rate of about 500 m$^3$/hr, about 1,500 m$^3$/hr, about 2,000 m$^3$/hr, about 2,500 m$^3$/hr, or about 2,800 m$^3$/hr to about 3,500 m$^3$/hr, about 4,500 m$^3$/hr, about 5,250 m$^3$/hr, or about 6,000 m$^3$/hr. The one or more reforming exchangers can include a KBR Reforming Exchanger System ("KRES"). Additional KRES process conditions, catalysts, and other details can be found in U.S. Pat. Nos. 5,011,625; 5,122,299; 5,362,454; 6,855,272; 7,138,001; and 7,220,505, and in U.S. Patent Application Publication No.: 2011/0042620. Additional reforming exchanger types, catalyst types, process conditions, and other details can include those discussed and described in U.S. Pat. Nos. 7,074,347 and 6,224,789.

Heat required for endothermic reforming reactions within the catalyst-containing tubes of the reforming exchanger 218 can be provided from the reformed effluent 217. The reformed effluent introduced via line 217, either alone, mixed or otherwise combined with the second hydrocarbon 206, can flow along the outside of the one or more catalyst-containing tubes, thereby indirectly transferring heat from the reformed effluent to the second hydrocarbon introduced via line 217 to the reforming exchanger 218.

The second effluent in line 215 can include hydrogen, carbon monoxide, carbon dioxide, methane, or any mixture thereof. The second effluent in line 215 can include an increased amount of hydrogen and a decreased amount of methane relative to the first hydrocarbon in line 204. The second effluent in line 215 can have a hydrogen concentration of about 50 mol %, about 54 mol %, about 58 mol %, or about 63 mol % to about 65 mol %, about 68 mol %, about 72 mol %, or about 75 mol %. The second effluent in line 215 can have a carbon monoxide concentration of about 3 mol %, about 4.5 mol %, about 5.5 mol %, or about 6 mol % to about 6.5 mol %, about 7 mol %, about 11 mol %, or about 15 mol %. The second effluent in line 215 can have a carbon dioxide concentration of about 8 mol %, about 10 mol %, about 12 mol %, or about 13 mol % to about 14 mol %, about 16 mol %, about 18 mol %, or about 20 mol %. The second effluent in line 215 can have components such as $C_2$ and heavier hydrocarbons being absent or minimally present, for example at less than about 1 mol %.

The second effluent in line 215 can be at a temperature of about 650° C., about 700° C., about 725° C., or about 768° C. to about 774° C., about 790° C., about 805° C., or about 820° C. The pressure of the second effluent in line 215 can range from about 2,000 kPa, about 2,500 kPa, about 3,000 kPa, or about 3,400 kPa to about 3,500 kPa, about 3,800 kPa, about 4,500 kPa, or about 5,500 kPa.

The second effluent 215 can be further reformed in the presence of one or more fourth catalysts in a second secondary reformer 220 to produce a second syngas 226. For example, the second effluent 215 can be introduced to the second secondary reformer 220 which can be an ATR. The second secondary reformer 220 can be the same or similar to the first secondary reformer 216. A second oxidant, such as oxygen enriched air, can be introduced via line 209 to the second secondary reformer 220. The oxygen enriched air introduced via line 209 can be used to partially combust a portion of the second effluent introduced via line 215 to provide heat that drives an endothermic reforming reaction within one or more catalyst beds disposed within the second secondary reformer 220.

The first syngas in line 224 can include methane, hydrogen, nitrogen, carbon monoxide, carbon dioxide or any mixture thereof. The first syngas in line 224 can have a hydrogen concentration of about 40 mol %, about 44 mol %, about 48 mol %, or about 51 mol % to about 53 mol %, about 58 mol %, about 63 mol %, or about 65 mol %. The first syngas in line 224 can have a carbon monoxide concentration of about 8 mol %, about 10 mol %, about 12 mol %, or about 13 mol % to about 14 mol %, about 16 mol %, about 18 mol %, or about 20 mol %. The first syngas in line 224 can have a carbon dioxide concentration of about 3 mol %, about 5 mol %, about 6 mol %, or about 7 mol % to about 9 mol %, about 13 mol %, about 16 mol %, or about 20 mol %.

The first syngas in line 224 can be at a temperature of about 700° C., about 740° C., about 780° C., or about 800° C. to about 810° C., about 835° C., about 860° C., or about 900° C. The pressure of the first syngas in line 224 can range from about 2,000 kPa, about 2,400 kPa, about 2,800 kPa, or about 3,100 kPa to about 3,300 kPa, about 3,800 kPa, about 4,600 kPa, or about 5,500 kPa. The first syngas in line 224 can have a hydrogen to nitrogen molar ratio of about 3.5:1 to about 0.5:1, or about 3:1 to about 1:1.

The second syngas in line 226 can include methane, hydrogen, nitrogen, carbon monoxide, carbon dioxide, or any mixture thereof. The second syngas in line 226 can have a hydrogen concentration of about 35 mol %, about 45 mol %, about 52 mol %, or about 55 mol % to about 58 mol %, about 65 mol %, about 64 mol %, or about 65 mol %. The second syngas in line 226 can have a methane concentration of about 0.05 mol %, about 0.1 mol %, about 0.2 mol %, or about 0.3 mol % to about 0.4 mol %, about 0.5 mol %, about 0.7 mol %, or about 1 mol %. The second syngas in line 226 can have a carbon monoxide concentration of about 7 mol %, about 9 mol %, about 11 mol %, or about 13 mol % to about 14 mol %, about 16 mol %, about 18 mol %, or about 20 mol %. The second syngas in line 226 can have a carbon dioxide concentration about 4 mol %, about 6 mol %, about 7.5 mol %, or about 8 mol % to about 10 mol %, about 13 mol %, about 16 mol %, or about 20 mol %.

The second syngas in line 226 can be at a temperature of about 800° C., about 850° C., about 900° C., or about 980° C. to about 990° C., about 1,050° C., about 1,100° C., or about 1,150° C. The pressure of the second syngas in line 226 can range from about 2,000 kPa, about 2,500 kPa, about 3,000 kPa, or about 3,300 kPa to about 3,400 kPa, about 4,400 kPa, about 4,900 kPa, or about 5,500 kPa. The second syngas in line 226 can have a hydrogen to nitrogen molar ratio of about 1:1 to about 3:1 or about 1.5:1 to about 2:1.

Referring again to the primary reformer, the primary reformer 212 can be steam-methane reformer ("SMR") that can include a combination of radiant and/or convective reformers that operate at a relatively low heat duty. The primary reformer 212 can operate at a temperature of from about 650° C. to about 850° C., for example from about 750° C. to about 800° C., and can have a heat output of from about 250 MMBtu/hr to about 300 MMBtu/hr, for a 1500 t/d ammonia plant. In one or more embodiments, about 10% or more, about 14% or more, or about 36.6% or more of the heat produced within the primary reformer 212 can be utilized for reforming the first hydrocarbon introduced via line 204.

The fuel combusted to generate the heat within the primary reformer 212 can include low grade fuel sources rather than fresh natural gas or other high quality hydrocarbon feeds. Suitable low grade fuel sources can include, but are not limited to, biomass (e.g., plant and/or animal matter and/or plant and/or animal derived matter), coal (e.g., high-sodium and low-sodium lignite, lignite, subbituminous, and/or anthracite), oil shale, coke, petroleum coke, tar, asphaltenes, low ash or no ash polymers, heavy hydrocarbon sludge and bottoms products from petroleum refineries and petrochemical plants (e.g., hydrocarbon waxes, blends thereof, and combinations thereof), hydrocarbon-based polymeric materials, petroleum coke, or any combination thereof.

The primary reformer 212 can include one or more radiantly heated, single walled, catalyst-containing tubes. The diameter of the one or more catalyst tubes can reduce or minimize the radial temperature gradient of the tubes. The primary reformer 212 can also include one or more convective sections, e.g., the exhaust duct that can be used to heat one or more feeds. The one or more convective sections can use heat generated from the radiant section as a heating source.

As mentioned above, the first and second secondary reformers 216, 220 can be or include one or more ATRs. For example, the first and second secondary reformer 216, 220 can include one or more of the catalyst beds, which can at least partially reform the first and second effluents effluent introduced via lines 214, 215. The first and second oxidants via lines 207, 209 can be introduced to a burner within the first and second secondary reformers, which can combust a portion of the first effluent introduced via line 214 and second effluent introduced via line 215 to provide heat that can be used to further endothermically reform at least a portion of the first and second effluents within the one or more catalyst beds.

The reforming exchanger 218 can be a shell-and-tube type exchanger that includes one or more tubes at least partially disposed within the shell-side of the reforming exchanger 218. One or more catalysts can be disposed within the one or more tubes to provide the one or more catalyst-containing tubes. The one or more catalyst-containing tubes can be arranged in any pattern or configuration within the shell of the reforming exchanger 218. Although not shown, the catalyst-containing tubes can include, but are not limited to, one or more fins, static mixers, rifling, heat conductive packing, turbulence causing projections, or any combination thereof, disposed on the external surface and/or the internal surface of the catalyst-containing tubes. The one or more catalyst-containing tubes can be of various types, for example, straight tubes, bayonet tubes (not shown), U-tubes (not shown), coiled tubes (not shown), or any combination thereof. The one or more catalyst-containing tubes can be disposed in vertical, horizontal, or at any other angle within the reforming exchanger 218.

As shown in FIG. 2, the first syngas via line 224 can be introduced to a first waste heat boiler 225 to produce a cooled first syngas via line 231. The cooled first syngas in line 231 can be at a temperature of about 300° C., about 325° C., about 350° C., or about 370° C. to about 375° C., about 390° C., about 410° C., or about 425° C. The cooled first syngas in line 231 can be at a pressure of about 2,000 kPa, about 2,500 kPa, about 3,000 kPa, or about 3,300 kPa to about 3,400 kPa, about 4,400 kPa, about 4,900 kPa, or about 5,500 kPa. In one or more embodiments, at least a portion of the first syngas can bypass the first waste heat boiler 225.

The cooled first syngas via line 231 can be introduced to a first shift converter 230 to convert at least a portion of the carbon monoxide present in the first syngas to carbon dioxide thereby producing a shifted first syngas 237. The first shift converter 230 can be the shift converter discussed and described above with reference to FIG. 1. The first shift converter 230 can include, but is not limited to, single stage adiabatic fixed bed reactors, multiple-stage adiabatic fixed bed reactors with interstage cooling, steam generation or cold quench reactors, tubular fixed bed reactors with steam generation or cooling, fluidized bed reactors, or any combination thereof.

The first shift converter 230 can include two or more reactors arranged in series and/or parallel. The first shift converter 230 can include one or more high temperature shift converters ("HTSC"), one or more medium temperature shift converters ("MTSC") (not shown), one or more low temperature shift converters ("LTSC"), or any combination thereof. At least a portion of the cooled first syngas via line 231 can be introduced to a first HTSC 233. At least a portion of the syngas via line 235 leaving the HTSC 223 can be introduced to a first LTSC 236. At least a portion of the cooled first syngas via line 231 can be introduced to one or more HTSCs, MTSCs, and/or LTSCs in any order and/or combination thereof.

The first HTSC 233, MTSC (not shown), and LTSC 236 can convert carbon monoxide in the second syngas in line 226 to carbon dioxide by reacting the carbon monoxide in the presence of one or more catalysts, at a temperature sufficient to oxidize the carbon monoxide. The catalyst within the first HTSC 233 can include, but is not limited to, iron oxide, zinc ferrite, magnetite, chromium oxides, derivatives thereof, or any mixture thereof. The first HTSC 233 can be operated at a temperature of from about 320° C. to about 380° C., or from about 370° C. to about 425° C. The catalyst within the MTSC can include, but is not limited to, iron oxide, chromium oxide, derivatives thereof, or any mixture thereof. The MTSC can be operated at a temperature of from about 250° C. to about 325° C. The catalyst within the first LTSC 236 can include, but is not limited to, copper, zinc, copper promoted chromia, derivatives thereof, or any mixture thereof. The first LTSC 236 can be operated at a temperature from about 200° C. to about 225° C.

The shifted first syngas via line 237 can exit the first shift converter 230. The shifted first syngas in line 237 can have a hydrogen concentration of about 45 mol %, about 48 mol %, about 54 mol %, or about 56 mol % to about 59 mol %, about 64 mol %, about 68 mol %, or about 70 mol %. The shifted first syngas in line 237 can have a nitrogen concentration of about 18 mol %, about 20 mol %, about 22 mol %, or about 23 mol % to about 24 mol %, about 26 mol %, about 30 mol %, or about 35 mol %. The shifted first syngas in line 237 can have a carbon dioxide concentration about 10 mol %, about 13 mol %, about 15 mol %, or about 17 mol % to about 18 mol %, about 21 mol %, about 25 mol %, or about 30 mol %. The shifted first syngas in line 237 can have a carbon monoxide concentration of about 0.1 mol %, about 0.25 mol %, about 0.5 mol %, or about 0.6 mol % to about 0.7 mol %, about 0.8 mol %, about 0.9 mol %, or about 1 mol %.

The shifted first syngas via line 237 can be introduced to one or more carbon dioxide removal units 250 to remove at least a portion of the carbon dioxide contained therein. The one or more carbon dioxide removal units 250 can be the carbon dioxide removal units discussed and described above with reference to FIG. 1.

The one or more carbon dioxide removal units can include one or more absorption/desorption type, solvent-based systems. An absorption/desorption type, solvent based system can contact the syngas introduced thereto with one or more absorbents to remove at least a portion of the carbon dioxide therefrom. Carbon dioxide selective adsorbents can include, but are not limited to, monoethanolamine ("MEA"), diethanolamine ("DEA"), triethanolamine ("TEA"), potassium carbonate, methyldiethanolamine ("MDEA"), activated methyldiethanolamine ("aMDEA"), 2-(2-aminoethoxy) ethanol, diisopropanolamine ("DIPA"), derivatives thereof, or any mixture thereof. Other suitable adsorbents and techniques can include, but are not limited to, propylene carbonate physical adsorbent solvent as well as other alkyl carbonates, dimethyl ethers of polyethylene glycol of two to twelve glycol units (SELEXOL® process), n-methyl-pyrrolidone, sulfolane, and use of the SULFINOL® Gas Treatment Process.

The carbon dioxide removal unit 250 can produce a carbon dioxide-lean first syngas via line 251 and a carbon dioxide product via line 253. The carbon dioxide-lean first syngas in line 251 can have a hydrogen concentration of about 60 mol %, about 63 mol %, about 66 mol %, or about 69 mol % to about 71 mol %, about 74 mol %, about 77 mol %, or about 80 mol %. The carbon dioxide-lean first syngas in line 251 can have a nitrogen concentration of about 10 mol %, about 15 mol %, about 20 mol %, or about 25 mol % to about 28 mol %, about 30 mol %, about 32 mol %, or about 35 mol %. The carbon dioxide-lean first syngas in line 251 can have a carbon dioxide concentration of about 0.005 mol %, about 0.01 mol %, about 0.05 mol %, or about 0.07 mol % to about 0.09 mol %, about 0.1 mol %, about 0.5 mol %, or about 0.7 mol %. The carbon dioxide-lean first syngas in line 251 can have a carbon monoxide concentration of about 0.1 mol %, about 0.2 mol %, about 0.3 mol %, or about 0.4 mol % to about 0.5 mol %, about 0.6 mol %, about 0.7 mol %, or about 0.8 mol %. The carbon dioxide-lean first syngas in line 251 can have a hydrogen to nitrogen molar ratio of about 2:1 to about 2.8:1 or about 2.4:1 to about 2.75:1.

The carbon dioxide-lean first syngas in line 251 and/or the carbon dioxide product in line 253 can be introduced to one or more driers (not shown) to reduce the amount of water contained therein. For example, the one or more dries can remove or separate most, e.g., greater than about 50%, of the water from the carbon dioxide-lean first syngas and/or the carbon dioxide product. The one or more driers can include, but are not limited to one or more molecular sieves, absorbents, adsorbents, flash tank separators, incinerators, or any combination thereof. Suitable absorbents can include, but are not limited to, glycol, alkali-earth halide salts, derivatives thereof, or mixtures thereof. Suitable adsorbents can include but are not limited to, activated alumina, silica gel, molecular sieves, activated carbon, derivatives thereof, or mixtures thereof.

The carbon dioxide-lean first syngas via line 251 can be introduced to one or more first methanators 255 to produce a methanated first syngas 256. The first methanator 255 can include any one or a combination of physical, mechanical, electrical and/or chemical systems to convert carbon monoxide and carbon dioxide to methane, configured either in series, parallel, or any combination thereof. The methanator 155 can include a catalytic process operating at a temperature sufficient to convert or react at least a portion of the carbon monoxide and/or carbon dioxide to methane and water. The one or more catalytic process can include one or more catalytic reactors arranged in series or parallel, containing one or more catalysts suitable for the conversion of carbon monoxide and carbon dioxide to methane. Suitable methanator catalysts can include, but are not limited to, nickel, a rare earth promoted nickel, derivatives thereof, or combinations thereof. The methanator 255 can operate at a temperature of from about 150° C. to about 350° C.

The first methanator 255 can produce a methanated first syngas via line 256. The methanated first syngas in line 256 can have a hydrogen concentration of about 60 mol %, about 63 mol %, about 66 mol %, or about 68 mol % to about 70 mol %, about 75 mol %, about 80 mol %, or about 85 mol %. The methanated first syngas in line 256 can have a nitrogen concentration of about 10 mol %, about 15 mol %, about 20 mol %, or about 25 mol % to about 28 mol %, about 32 mol %, about 35 mol %, or about 40 mol %. The methanated first syngas in line 256 can have a carbon dioxide concentration of about 0 mol %, about 0.00005 mol %, about 0.0001 mol %, or about 0.005 mol % to about 0.008 mol %, about 0.01 mol %, about 0.025 mol %, or about 0.05 mol %. The methanated first syngas in line 256 can have a carbon monoxide concentration of about 0 mol %, about 0.00005 mol %, about 0.0001 mol %, or about 0.005 mol % to about 0.008 mol %, about 0.01 mol %, about 0.025 mol %, or about 0.05 mol %. The methanated first syngas in line 256 can have a methane concentration of about 0.1 mol %, about 0.4 mol %, about 0.6 mol %, or about 0.8 mol % to about 1.2 mol %, about 1.6 mol %, about 2 mol %, or about 2.5 mol %. In one or more embodiments, the methanated first syngas in line 256 can include about 63 mol % to about 68 mol % hydrogen, about 20 mol % to about 30 mol % nitrogen, up to about 0.005 mol % carbon dioxide, up to about 0.005 mol % carbon monoxide, and about 0.4 mol % to about 0.8 mol % methane.

The methanated first syngas in line 256 can have a hydrogen to nitrogen molar ratio of about 1.8:1 to about 3.1:1 or about 2.2:1 to about 2.8:1. In another example, the hydrogen to nitrogen molar ratio of the methanated first syngas in line 256 can be at least 2:1, at least 2.2:1, or at least 2.4:1 and up to about 2.5:1, about 2.7:1 or about 2.8:1. In another example, the hydrogen to nitrogen molar ratio of the methanated first syngas in line 256 can be less than 3:1 less than 2.5:1, or less than 2:1.

The second syngas via line 226 can be introduced to a waste heat boiler 227 to produce a cooled second syngas 229. The cooled second syngas in line 229 can be at a temperature of about 300° C., about 325° C., about 350° C., or about 370° C. to about 380° C., about 400° C., about 410° C., or about 425° C. The cooled second syngas in line 229 can be at a pressure of about 2,000 kPa, about 2,500 kPa, about 3,000 kPa, or about 3,300 kPa to about 3,400 kPa, about 3,900 kPa, about 4,500 kPa, or about 5,500 kPa.

In one or more embodiments, at least a portion of the second syngas 226 can bypass the waste heat boiler 227 via line 228. In one or more embodiments, the at least a portion of the second syngas in line 226 can bypass the waste heat boiler 227 to control the temperature of the syngas leaving the reforming unit. The second syngas in line 228 can be at a temperature of about 800° C., about 875° C., about 950° C., or about 1,005° C. to about 1,020° C., about 1,075° C., about 1,100° C., or about 1,150° C. The second syngas in line 228 can be at a pressure of about 2,000 kPa, about 2,700 kPa, about 3,000 kPa, or about 3,300 kPa to about 3,400 kPa, about 3,700 kPa, about 4,500 kPa, or about 5,500 kPa.

The second syngas via line 241 can be introduced to one or more shift converters or a second shift converter 240 to convert at least a portion of the carbon monoxide contained in the second syngas to carbon dioxide thereby producing a shifted second syngas via line 249. The second shift converter 240 can be the same or similar to the first shift converter 230. The second shift converter 240 can be the same or similar to the shift converter 130 discussed and described above with reference to FIG. 1. For example, the second shift converter 240 can include, but is not limited to, single stage adiabatic fixed bed reactors, multiple-stage adiabatic fixed bed reactors with interstage cooling, steam generation or cold quench reactors, tubular fixed bed reactors with steam generation or cooling, fluidized bed reactors, or any combination thereof.

The second shift converter 240 can include two or more reactors arranged in series and/or parallel. The second shift converter 240 can include one or more second HTSCs 243, one or more second MTSCs (not shown), one or more second LTSC 246, or any combination thereof. The second HTSC 243, MTSCs (not shown), and LTSC 246 can be as discussed and described above with reference to the first shift converter 230.

The second syngas in line 249 can contain less carbon monoxide than the second syngas in line 241. The second shifted syngas in line 249 can contain less than about 0.3 mol % carbon monoxide, less than about 15 mol % carbon monoxide, less than about 5 mol % carbon monoxide, or less than about 1.5 mol % carbon monoxide.

The second syngas via line 241 can be apportioned equally or unequally to any one or more of the second HTSC 243, MTSC (not shown), and LTSC 246. For example, about 70 vol % of the second syngas in line 241 can be introduced to the second HTSC 243 and about 30 vol % can be introduced to the second LTSC 246. The second syngas 241 can be introduced to the second HTSC 243 only, the second LTSC 246 only, or a combination of thereof. In one embodiment, at least a portion of the second syngas can bypass the second HTSC 243 via line 242 and at least a portion of the second syngas can bypass the second LTSC 246 via line 248. Though not shown, the shifted syngas from the HTSC and/or the LTSC can then be introduced to the one or more heat exchangers and/or second waste heat boiler.

The shifted second syngas exiting the second HTSC in line 244 can include methane, ethane, propane, butane, pentane, hexane, hydrogen, or any mixture thereof. The second syngas in line 245 can include the at least a portion of the second syngas that bypassed the second HTSC 243 via line 242 and the shifted second syngas 244. The shifted second syngas exiting the second LTSC in line 247 can include hydrogen, nitrogen, carbon monoxide, carbon dioxide, methane, ethane, propane, butane, pentane, hexane, hydrogen, or any mixture thereof.

The second syngas in line 249 can have a hydrogen concentration of about 35 mol %, about 45 mol %, about 50 mol %, or about 54 mol % to about 64 mol %, about 67 mol %, about 68 mol %, or about 70 mol %. The second syngas in line 249 can have a nitrogen concentration of about 18 mol %, about 20 mol %, about 23 mol %, or about 25 mol % to about 26 mol %, about 28 mol %, about 30 mol %, or about 32 mol %. The second syngas in line 249 can have a carbon dioxide concentration of about 10 mol %, about 14 mol %, about 16 mol %, or about 18 mol % to about 20 mol %, about 22 mol %, about 26 mol %, or about 30 mol %. The second syngas in line 249 can have a carbon monoxide concentration of about 0.1 mol %, about 0.2 mol %, about 0.3 mol %, or about 0.4 mol % to about 0.5 mol %, about 0.6 mol %, about 0.8 mol %, or about 1 mol %. The second syngas in line 249 can have a methane concentration of about 0.1 mol %, about 0.2 mol %, about 0.3 mol %, or about 0.4 mol % to about 0.5 mol %, about 0.6 mol %, about 0.8 mol %, or about 1 mol %. The second syngas in line 249 can have an argon concentration of about 0.1 mol %, about 0.2 mol %, about 0.25 mol %, or about 0.3 mol % to about 0.35 mol %, about 0.4 mol %, about 0.45 moi %, or about 0.5 mol %.

The second syngas 226 can be introduced to one or more second syngas purification systems. The second syngas purification system can include, but is not limited to, one or more PSA units, methanators, driers, or any combination thereof. As shown in FIG. 2, the second syngas can be introduced via line 249 to one or more PSA units 260 to produce a purified second syngas 261 and a waste gas 263. The PSA unit 260 can be the same as or similar to the PSA unit discussed and described with reference to FIG. 1. The PSA unit 260 can process the second syngas at a rate of about 350 m$^3$/hr, about 1,000 m$^3$/hr, about 2,500 m$^3$/hr, about 3,500 m$^3$/hr, or about 4,000 m$^3$/hr, to about 4,500 m$^3$/hr, about 5,500 m$^3$/hr, about 7,000 m$^3$/hr, about 8.500 m$^3$/hr. The PSA unit 260 can have a typical hydrogen recoveries (hydrogen in purified gas/hydrogen in feed gas to PSA) of about 70%, about 75%, or about 85% to about 90%, about 95%, or about 98%. The PSA unit 260 can have a typical nitrogen recoveries (nitrogen in purified gas/nitrogen in feed gas to PSA) of about 5%, about 10%, or about 20% to about 40%, about 55%, or about 75%.

The purified second syngas in line 261 can have a hydrogen concentration of about 75 mol %, about 84 mol %, about 87 mol %, or about 90 mol % to about 92 mol %, about 97 mol %, about 97.5 mol %, or about 99.5 mol %. The purified second syngas in line 261 can have a nitrogen concentration of about 0.1 mol %, about 1 mol %, about 5 mol %, or about 8 mol % to about 9 mol %, about 12 mol %, about 18 mol %, or about 25 mol %. The purified second syngas in line 261 can have a carbon dioxide concentration of about 0 mol %, about 0.05 mol %, or about 0.1 mol % to about 0.15 mol %, about 0.2 mol %, or about 0.25 mol %. The purified second syngas in line 261 can have a carbon monoxide concentration of about 0 mol %, about 0.05 mol %, or about 0.1 mol % to about 0.15 mol %, about 0.2 mol %, or about 0.25 mol %. The purified second syngas in line 261 can have a methane concentration of about 0 mol %, about 0.05 mol %, or about 0.1 mol % to about 0.15 mol %, about 0.2 mol %, or about 0.25 mol %. The purified second syngas in line 261 can have a argon concentration of about 0 mol %, about 0.5 mol %, about 0.8 mol %, or about 1 mol % to about 1.3 mol %, about 1.5 mol %, about 1.7 mol %, or about 2 mol %.

The purified second syngas in line 261 can have a hydrogen to nitrogen molar ratio of about 3:1 to about 12:1, about 4.3:1 to about 10.5:1, or about 5:1 to about 9.5:1. In another example, the hydrogen to nitrogen molar ratio of the purified second syngas in line 261 can at least about 3:1, about 4.5:1 or about 5:1 and up to about 10:1, about 12:1, or about 18:1. In another example, the hydrogen to nitrogen molar ratio of the purified second syngas in line 261 can be less than 15:1, less than 10:1, less than 4:1.

At least a portion of the waste gas in line 263 can be recycled to the primary reformer 212 to be used as fuel. In one or more embodiments, at least a portion of the waste gas in line 263 can be introduced to any component of the system to be used as fuel. The waste gas in line 263 can be used as part of fuel in the primary reformer. The waste gas in line 263 can have a carbon dioxide concentration of about 30 mol %, about 35 mol %, about 37 mol %, or about 38 mol % to about 40 mol %, about 42 mol %, about 45 mol %, or about 50 mol %. The waste gas in line 263 can have a carbon monoxide concentration of about 0.2 mol %, about 0.4 mol %, about 0.6 mol %, or about 0.8 mol % to about 1 mol %, about 1.2 mol %, about 1.5 mol %, or about 2 mol %. The waste gas in line 263 can have a nitrogen concentration of about 10 mol %, about 15 mol %, about 20 mol %, or about 25 mol % to about 28 mol %, about 35 mol %, about 45 mol %, or about 60 mol %. The waste gas 263 can be introduced to the reforming system 210 to be used as a fuel. The waste gas in line 263 can have a Btu (LHV) rating of about 300 Btu/lb, about 650 Btu/lb, or about 800 Btu/lb to about 1,500 Btu/lb, about 1,800 Btu/lb, or about 2,500 Btu/lb. The waste gas 263 can have a total energy of about 50 MMBtu/hr, about 75 MMBtu/hr, or about 100 MMBtu/hr to about 200 MMBtu/hr, about 350 MMBtu/hr, or about 450 MMBtu/hr.

A second methanator 270 can be a designed to receive gas from the PSA unit 260 to convert at least of any carbon monoxide and carbon dioxide contained in the purified second syngas to methane and water. In one or more embodiments, the second methanator 270 can be designed to handle milder conditions of synthesis gas from the PSA unit 260, thereby reducing the catalyst volume needed in the methanator 270.

In one or more embodiments, at least a portion of the purified second syngas 261 leaving the PSA unit 260 can be introduced to the second methanator 270 via line 265. The second methanator 270 can be as discussed and described above with reference to the first methanator 255. The second methanator 270 can produce a methanated second syngas via line 271. The methanated second syngas in line 271 can have a hydrogen concentration of about 75 mol %, about 85 mol %, about 88 mol %, or about 90 mol % to about 92 mol %, about 95 mol %, about 97 mol %, or about 99.5 mol %. The methanated second syngas in line 271 can have a nitrogen concentration of about 0.1 mol %, about 1 mol %, about 5 mol %, or about 8 mol % to about 9 mol %, about 12 mol %, about 18 mol %, or about 25 mol %. The methanated second syngas in line 271 can have a methane concentration of 0 mol %, about 0.05 mol %, or about 0.1 mol % to about 0.15 mol %, about 0.2 mol %, or about 0.25 mol %. The methanated second syngas in line 271 can have a carbon monoxide concentration of 0 mol %, about 0.05 mol %, or about 0.1 mol % to about 0.15 mol %, about 0.2 mol %, or about 0.25 mol %. The methanated second syngas in line 271 can have a carbon dioxide concentration of 0 mol %, about 0.05 mol %, or about 0.1 mol % to about 0.15 mol %, about 0.2 mol %, or about 0.25 mol %. The methanated second syngas in line 271 can have a hydrogen to nitrogen molar ratio of about 3:1 to about 12:1, about 4.3:1 to about 10.2:1, or about 9.5:1 to about 5:1. In one or more embodiments, the methanated second syngas in line 271 can include about 95 mol % to about 99.5 mol % hydrogen, about 1 mol % to about 5 mol % nitrogen, up to about 0.2 mol % carbon monoxide, up to about 0.2 mol % carbon dioxide, and a hydrogen to nitrogen molar ratio of about 8:1 to about 12:1.

In one or more embodiments, at least a portion of the second syngas via line 260 can bypass the second methanator 270 via line 264. In one or more embodiments, the syngas the second syngas in line 264 can be mixed with the methanated second syngas 271 to produce the purified second syngas in line 267. The amount of the purified second syngas introduced to the second methanator 270 can be about 0 mol %, about 100 mol % or about 20 mol % to about 80 mol %, about 40 mol % to about 60 mol % of the purified second syngas from line 261. In one or more embodiments, all of the second syngas leaving the PSA unit 260 can bypass the second methanator 270 via line 264. Accordingly, the second methanator 270 can be absent from the system 200.

At least a portion of the methanated first syngas 256 and at least a portion of the purified second syngas 267 can be combined to produce an ammonia feedstock 275. For example, the ammonia feedstock 275 can be introduced to the ammonia synthesis unit 280 to produce an ammonia product 281 and a purge gas 283. The ammonia synthesis unit 280 can be the same as, or similar to, the ammonia synthesis unit discussed and described above with reference to FIG. 1. The ammonia feedstock 275 can have a flow rate of about 500 m$^3$/hr, about 2,000 m$^3$/hr, or about 6,000 m$^3$/hr to about 9,500 m$^3$/hr, about 12,000 m$^3$/hr, or about 30,000 m$^3$/hr.

The ammonia feedstock in line 275 can have a hydrogen concentration of about 65 mol %, about 68 mol %, about 72 mol %, or about 74 mol % to about 76 mol %, about 80 mol %, or about 85 mol %. The ammonia feedstock in line 275 can have a nitrogen concentration of about 15 mol %, about 18 mol %, about 21 mol %, or about 24 mol % to about 25 mol %, about 27 mol %, about 30 mol %, or about 35 mol %. The ammonia feedstock in line 275 can have a carbon dioxide concentration of 0 mol %, about 0.005 mol %, or about 0.01 mol % to about 0.015 mol %, about 0.02 mol %, or about 0.1 mol %. The ammonia feedstock in line 275 can have a carbon monoxide concentration of 0 mol %, about 0.005 mol %, or about 0.01 mol % to about 0.015 mol %, about 0.02 mol %, or about 0.1 mol %. The ammonia feed stock in line 275 can have a hydrogen to nitrogen molar ratio of about 2.7:1, about 2.9:1, about 2.95:1 or about 3:1 to about 3.05:1, about 3.1:1, about 3.2:1, or about 3.4:1. In one or more embodiments, the ammonia feedstock in line 275 can include about 68 mol % to about 74 mol % hydrogen, up to about 0.05 mol % carbon monoxide, up to about 0.05 mol % carbon dioxide, and can have a hydrogen to nitrogen molar ratio of about 2.95:1 to about 3.05:1.

The ammonia synthesis unit 280 can produce an ammonia product in line 281 which can have an ammonia concentration of about 95 mol %, about 98 mol %, about 99 mol %, or about 99.5 mol % to about 99.9 mol %, about 99.92 mol %, about 99.99 mol %, or about 100 mol %. The ammonia product in line 281 can have a hydrogen concentration of about 0 mol %, about 0.001 mol %, about 0.01 mol %, or about 0.02 mol % to about 0.03 mol %, about 0.09 mol %, about 0.2 mol %, or about 0.5 mol %. The ammonia product in line 281 can have a nitrogen concentration of about 0 mol %, about 0.01 mol %, about 0.02 mol %, or about 0.03 mol % to about 0.05 mol %, about 0.1 mol %, about 0.2 mol %, or about 0.3 mol %. The ammonia product in line 281 can have a carbon dioxide concentration of about 0 mol %, about 0.005 mol %, or about 0.01 mol % to about 0.015 mol %, about 0.02 mol %, or about 0.1 mol %. The ammonia product in line 281 can have a carbon monoxide concentration of about 0 mol %, about 0.005 mol %, or about 0.01 mol % to about 0.015 mol %, about 0.02 mol %, or about 0.1 mol %.

All or any portion of the purge gas in line 283 can be recycled to the first hydrocarbon in line 204 and/or the second hydrocarbon in line 206 and/or as low grade fuel (not shown). Any portion of the purge gas in line 283 can be recycled to the second syngas. Any portion of the purge gas in line 283 can be recycled to the second syngas in line 226 at any point before the first syngas is introduced to the PSA unit 160. Any portion of the purge gas can be recycled directly to the PSA unit 160. About 2 vol % or more, about 5 vol % or more, about 10 vol % or more, about 25 vol % or more of the purge gas in line 283 can be recycled to the primary reformer 212. About 1 vol % or more, about 25 vol % or more, about 50 vol % or more, about 75 vol % or more, or about 100 vol % of the purge gas in line 283 can be recycled to the second syngas 226 at any point before the second syngas is introduced to the PSA unit 260. In one or more embodiments, none of the purge gas in line 183 is recycled to the second syngas 226. The purge gas in line 283 can have a heating value of about 5,000 BTU/lb, about 7,500 BTU/lb, or about 8,900 BTU/lb to about 10,000 BTU/lb, about 11,000 BTU/lb, or about 12,000 BTU/lb. The system 200 can include a "steam network" as discussed and described above with reference to FIG. 1.

Figure 3:
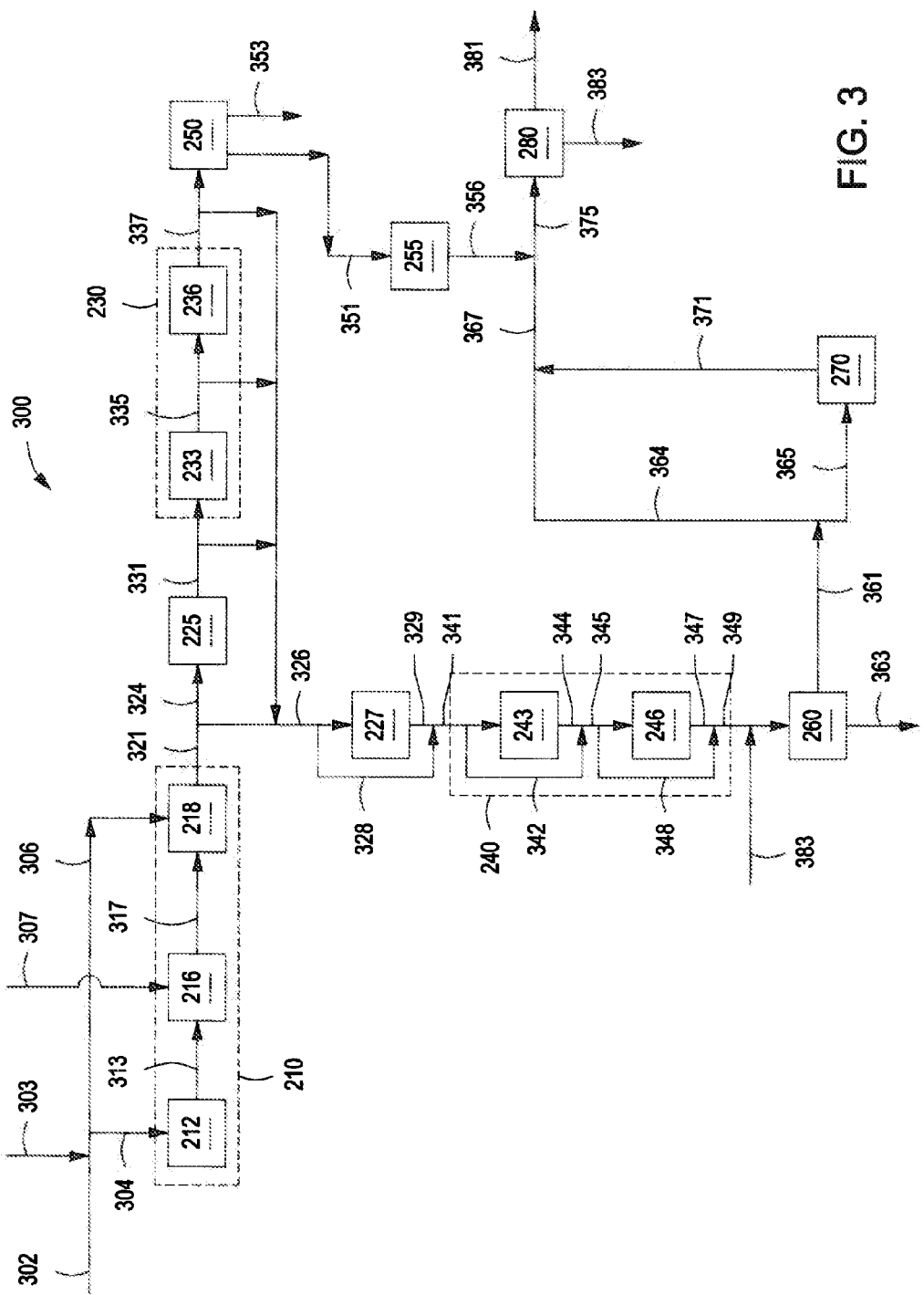
FIG. 3 depicts a schematic of another illustrative system for producing syngas, according to one or more embodiments described.

FIG. 3 depicts a schematic of yet another illustrative system for producing syngas, according to one or more embodiments. The reforming system 210 can include the primary reformer 212, secondary reformer 216, and reforming exchanger 218, which can be as discussed and described above with reference to FIGS. 1 and 2. The system 300 can also include the one or more shift converters 230, 240, including one or more HTSCs 233, 243, MTSCs, and/or LTSCs 236, 246, which can be as discussed and described above with reference to FIGS. 1 and 2. The system 300 can also include one or more carbon dioxide removal units 250, methanators 255, and ammonia synthesis units 280, which can be as discussed and described above with reference to FIGS. 1 and 2.

One or more hydrocarbons via line 302 can be divided, apportioned, split, or otherwise separated into a first hydrocarbon via line 304 and a second hydrocarbon via line 306. The first hydrocarbon in line 304 and the second hydrocarbon in line 306 can have the same composition, substantially the same composition, or different compositions with respect to one another. The first hydrocarbon in line 304 can be or include about 60 vol % to about 95 vol % or about 75 vol % to about 90 vol % of the hydrocarbon from line 302. The second hydrocarbon in line 306 can be or include about 5 vol % to about 40 vol % or about 10 vol % to about 25 vol % of the hydrocarbon from line 302. The second hydrocarbon in line 306 can be about 5 vol % to about 40 vol % of the hydrocarbon from line 302.

The hydrocarbon in line 302, the first hydrocarbon in line 304, and the second hydrocarbon in line 306 can have the same concentrations of methane, hydrogen, $C_2$-$C_3$ compounds, and $C_4$ and higher compounds as discussed and described above with reference to FIG. 2.

Prior to separating the hydrocarbon in line 302, the hydrocarbon can be preheated in one or more heat transfer zones (not shown). Prior to separating the hydrocarbon in line 302, the hydrocarbon can be desulfurized in one or more desulfurization units (not shown).

As shown in FIG. 3, steam 303 can be introduced to the hydrocarbon in line 302. Steam can be introduced to the hydrocarbon in line 302, first hydrocarbon in line 304 and/or to the second hydrocarbon in line 306. The first hydrocarbon in line 304 and the second hydrocarbon in line 306 can have a steam to carbon molar ratio (or steam to carbon content of the first hydrocarbon) of about 2:1, about 2.5:1, about 2.8:1, or about 3:1 to about 3.3:1, about 3.6:1, about 3.8:1, about 4:1, or about 4.5:1. The first hydrocarbon in line 304 can be reformed in the presence of steam 303 and one or more catalysts in the primary reformer 212 to produce a first effluent 313. The primary reformer 212 can be operated at a temperature of about 650° C., about 700° C., about 735° C., or about 770° C. to about 790° C., about 815° C., about 830° C., or about 850° C.

The first effluent 313 can include hydrogen, carbon monoxide, carbon dioxide, methane, or any mixture thereof. The first effluent in line 313 can include an increased amount of hydrogen and a decreased amount of methane as compared to the first hydrocarbon in line 304. The first effluent in line 313 can have a hydrogen concentration of about 50 mol %, about 55 mol %, about 60 mol %, or about 63 mol % to about 68 mol %, about 72 mol %, about 75 mol %, or about 80 mol %. The first effluent in line 313 can have a carbon monoxide concentration of about 3 mol %, about 4 mol %, about 6 mol %, or about 7 mol % to about 8.5 mol %, about 10 mol %, about 12 mol %, or about 15 mol %. The first effluent in line 313 can have a carbon dioxide concentration of about 8 mol %, about 10 mol %, about 11 mol %, or about 12 mol % to about 14 mol %, about 16 mol %, about 18 mol %, or about 20 mol %. The first effluent in line 313 can have components such as $C_2$ and heavier hydrocarbons being absent or minimally present, for example at less than about 1 mol %.

The first effluent in line 313 can be at a temperature of about 650° C., about 685° C., about 725° C., or about 769° C. to about 774° C., about 815° C., about 835° C., or about 850° C. The pressure of the first effluent in line 313 can range from about 2,000 kPa, about 2,600 kPa, about 3,100 kPa, or about 3,400 kPa to about 3,500 kPa, about 4,200 kPa, about 4,900 kPa, or about 5,500 kPa.

The first effluent in line 313 can be further reformed in the presence of an oxidant 307 one or more second catalysts in the secondary reformer 216 to produce a reformed effluent 317. The first effluent 313 can be introduced to the secondary reformer 216 which can be an ATR. An oxidant, such as oxygen enriched air, can be introduced via line 307 to the secondary reformer 216. The oxidant 307 and catalyst can be as discussed and described above with reference to FIG. 2. The secondary reformer 216 can be operated at a temperature of about 1,200° C., about 1,250° C., about 1,300° C., or about 1,4360° C. to about 1,390° C., about 1,455° C., about 1,500° C., or about 1,500° C.

The reformed effluent 317 can include hydrogen, carbon monoxide, carbon dioxide, nitrogen, and other minor components, such as argon and/or methane. The reformed effluent in line 317 can have a hydrogen concentration of about 35 mol %, about 40 mol %, about 46 mol %, or about 50 mol % to about 54 mol %, about 57 mol %, about 60 mol %, or about 65 mol %. The reformed effluent in line 317 can have a carbon monoxide concentration of about 7 mol %, about 8.5 mol %, about 10 mol %, or about 12 mol % to about 13.5 mol %, about 15 mol %, about 17 mol %, or about 20 mol %. The reformed effluent in line 317 can have a carbon dioxide concentration of 4 mol %, about 5.5 mol %, about 6.5 mol %, or about 7 mol % to about 7.5 mol %, about 10 mol %, about 15 mol %, about 20 mol %.

The reformed effluent in line 317 can be at a temperature of about 800° C., about 900° C., about 950° C., or about 1,000° C. to about 1,025° C., about 1,100° C., about 1,125° C., or about 1,150° C. The pressure of the reformed effluent in line 317 can range from about 2,000 kPa, about 2,500 kPa, about 3,000 kPa, or about 3,300 kPa to about 3,400 kPa, about 4,000 kPa, about 4,500 kPa, or about 5,500 kPa.

The reformed effluent 317 and/or the second hydrocarbon in line 306 can be reformed in the reforming exchanger 218 to produce a syngas via line 321. The reformed effluent 317 and the second hydrocarbon 306 can be introduced to the reforming exchanger 218 as discussed and described above with reference to FIGS. 1 and 2. The reforming exchanger 218 can reform the second syngas 306 and/or the reformed effluent 317 at a rate of about 500 m$^3$/hr, about 1,500 m$^3$/hr, about 2,000 m$^3$/hr. about 2,500 ma/hr, or about 2,800 m$^3$/hr, to about 3,500 m$^3$/hr, about 4,500 m$^3$/hr, about 5,250 m$^3$/hr, or about 6,000 m$^3$/hr.

The syngas in line 321 can include hydrogen, carbon monoxide, carbon dioxide, nitrogen, and other minor components, such as argon and/or methane. The syngas in line 321 can have a hydrogen concentration of about 40 mol %, about 45 mol %, about 49 mol %, or about 53 mol % to about 56 mol %, about 58 mol %, about 61 mol %, or about 65 mol %. The syngas in line 321 can have a carbon monoxide concentration of about 7 mol %, about 10 mol %, about 12 mol %, or about 13 mol % to about 14 mol %, about 16 mol %, about 18 mol %, or about 20 mol %. The syngas in line 321 can have a carbon dioxide concentration of about 3 mol %, about 5 mol %, about 6 mol %, or about 7 mol % to about 9 mol %, about 13 mol %, about 16 mol %, or about 20 mol %. In one or more embodiments, the syngas in line 321 can include about 49 mol % to about 53 mol % hydrogen, about 12 mol % to 14 mol % carbon monoxide, and about 5 mol % to about 7 mol % carbon dioxide.

The syngas in line 321 can be at a temperature of about 700° C., about 740° C., about 780° C., or about 800° C. to about 810° C., about 835° C., about 860° C., or about 900° C. The pressure of the syngas in line 321 can range from about 2,000 kPa, about 2,400 kPa, about 2,800 kPa, or about 3,100 kPa to about 3,300 kPa, about 3,800 kPa, about 4,600 kPa, or about 5,500 kPa. The syngas produced by the primary reformer 212, the secondary reformer 216, and the reforming exchanger 218 can be used in other processes as a fuel and/or a feed for producing one or more other products.

In one or more embodiments, at least a portion of the syngas via line 321 can be introduced to a first waste heat boiler 225. The cooled syngas in line 331 leaving the waste heat boiler 225 can be at a temperature of about 300° C., about 325° C., about 350° C., or about 370° C. to about 375° C., about 390° C., about 410° C., or about 425° C. In one or more embodiments, the syngas leaving via line 331 the first waste heat boiler 225 can be separated into the first syngas via line 324 and the second syngas via line 326.

In one or more embodiments, at least a portion of the syngas leaving the waste heat boiler 225 can be introduced to a first HTSC 233. The syngas via line 335 leaving the first HTSC 233 can be separated into the first syngas and the second syngas (not shown). In one or more embodiments, at least a portion of the syngas leaving the first HTSC 233 can be introduced to the first LTSC 236. The syngas via line 337 leaving the first LTSC 236 can be separated into the first syngas and the second syngas (not shown).

Referring again to FIG. 3, in one or more embodiments, the syngas 321 can be divided, apportioned, split, or otherwise separated into at least a first syngas via line 324 and a second syngas via line 326. The first syngas in line 324 can be or include about 90 vol % to about 35 vol % of the syngas from line 321. The first syngas in line 324 can be or include about 80 vol % to about 50 vol % of the syngas from line 321. The second syngas in line 326 can be or include about 10 vol % to about 65 vol % of the syngas from line 321. The second syngas in line 326 can be about 20 vol % to about 50 vol % of the syngas from line 321.

The first syngas via line 324 can be introduced to a first waste heat boiler 225 to produce the cooled first syngas 331. The cooled first syngas in line 331 can be introduced to the first shift converter 230, to convert at least a portion of the carbon monoxide contained in the first syngas to carbon dioxide thereby producing a shifted first syngas 337. The first shift converter 230 can include two or more reactors arranged in series and/or parallel. At least a portion of the syngas via line 331 can be introduced to the one or more HTSCs 233, MTSCs (not shown), and/or LTSCs 236 in any order and/or combination thereof. At least a portion of the first syngas via line 331 can be introduced to the first HTSC 233. At least a portion of the syngas leaving the HTSC 223 can be introduced to the first LTSC 236 via line 335.

The shifted first syngas via line 337 can exit the first shift converter 230. The shifted first syngas in line 337 can have a hydrogen concentration of about 45 mol %, about 50 mol %, about 54 mol %, or about 58 mol % to about 62 mol %, about 65 mol %, about 68 mol %, or about 70 mol %. The shifted first syngas in line 337 can have a nitrogen concentration of about 18 mol %, about 20 mol %, about 22 mol %, or about 23 mol % to about 24 mol %, about 26 mol %, about 30 mol %, or about 35 mol %. The shifted first syngas in line 337 can have a carbon dioxide concentration of about 10 mol %, about 13 mol %, about 15 mol %, or about 17 mol % to about 18 mol %, about 21 mol %, about 25 mol %, or about 30 mol %. The shifted first syngas in line 337 can have a carbon monoxide concentration of about 0.1 mol %, about 0.25 mol %, about 0.5 mol %, or about 0.6 mol % to about 0.7 mol %, about 0.8 mol %, about 0.9 mol %, or about 1 mol %.

The first syngas can be introduced via line 337 to one or more carbon dioxide removal units 250 to remove at least a portion of the carbon dioxide contained therein. The carbon dioxide removal unit 250 can selectively separate carbon dioxide from the first syngas, thereby producing a carbon dioxide-lean first syngas 351 and carbon dioxide product 353, which can have similar concentrations as the carbon dioxide-lean first syngas 251 and carbon dioxide product 253 discussed and described above in reference to FIG. 2. The carbon dioxide remove unit can be as described above with reference to FIGS. 1 and 2.

The carbon dioxide-lean first syngas via line 351 can be introduced to one or more first methanators 255 to convert at least a portion of the carbon monoxide and/or carbon dioxide to methane and water. The first methanator 255 can be as described above with reference to FIGS. 1 and 2. The first methanator 255 can produce a methanated first syngas via line 356. The methanated first syngas in line 356 can have the same or similar concentrations as the methanated first syngas in line 256, as discussed and described in reference to FIG. 2.

The methanated first syngas in line 356 can have a hydrogen to nitrogen molar ratio of about 3:1 to about 2:1 or about 2.7:1 to about 2.2:1. In another example, the hydrogen to nitrogen molar ratio of the methanated first syngas in line 356 can be at least 1.8:1, at least 2:1, or at least 2.2:1 and up to about 2.4:1, about 2.6:1 or about 2.8:1.

The second syngas via line 326 can be introduced to a second waste heat boiler 227 to produce a cooled second syngas via line 329. The cooled second syngas in line 329 can be at a temperature of about 300° C., about 325° C., about 350° C., or about 370° C. to about 380° C., about 400° C., about 410° C., or about 425° C. The cooled second syngas in line 329 can be at a pressure of 2,000 kPa, about 2,500 kPa, about 3,000 kPa, or about 3,300 kPa to about 3,400 kPa, about 3,900 kPa, about 4,500 kPa, or about 5,500 kPa. At least a portion of the second syngas via line 328 can bypass the second waste heat boiler 227 via line 328. In one or more embodiments, the second waste heat boiler 227 is not present in the system 300.

The second syngas via line 341 can be introduced to a second shift converter 240, to convert at least a portion of the carbon monoxide present in the second syngas to carbon dioxide. The second shift converter 240 can be as discussed and described above with reference to FIG. 2. The second shift converter can have a second HTSC 243, MTSC (not shown), LTSC 246, or a combination thereof.

The second syngas can bypass the second HTSC 243, LTSC 246, or both, as described above with reference to FIG. 2. In one or more embodiments, the second shift converter 240 is not present in the system 300. The second syngas via line 341 can be introduced to the second HTSC 243 to produce the second syngas in line 344. In one or more embodiments, at least a portion of the second syngas via line 342 can bypass the second HTSC 243. In one or more embodiments, the second HTSC 243 is not present in the system 300. The second syngas in line 345 can include the at least a portion of the second syngas that bypassed the second HTSC 243 via line 342 and the shifted second syngas 344. The second syngas via line 345 can be introduced to the second LTSC 246 to produce a shifted syngas via line 347. In one or more embodiments, at least a portion of the second syngas via line 348 can bypass the second LTSC 246. In one or more embodiments, the second LTSC 246 is not present in the system 300.

The second syngas via line 341 can be apportioned equally or unequally to any one or more of the second HTSCs, MTSCs, and LTSCs. For example, about 70 vol % of the second syngas via line 341 can be introduced to the second HTSC 243 and about 30 vol % can be introduced to the second LTSC 246. The converted syngas from the second HTSC 243 and the LTSC 246 can then be introduced to the one or more heat exchangers and/or second waste heat boiler units (not shown). The shifted second syngas can exit the second shift converter 240 via line 349. The shifted second gas in line 349 can have the same or similar concentrations as the shifted second gas in line 249, as discussed and described above in reference to FIG. 2.

The second syngas can be introduced to a PSA unit 260 to produce a purified second syngas via line 361 and a waste gas via line 363. The PSA unit 260 can be specially designed with regards the recoveries and rejection of syngas components in the purified syngas. The PSA unit 260 can be the PSA unit discussed and described with reference to FIGS. 1 and 2. The waste gas 363 from the PSA unit 260 can be transferred to the primary or secondary reformer 212, 216 to be used to be used as a fuel. The PSA unit 260 can process the second syngas at a rate of about 350 m$^3$/hr, about 1,000 m$^3$/hr, about 2,500 m$^3$/hr, or about 3,500 m$^3$/hr to about 4,000 m$^3$/hr, about 7,000 m$^3$/hr, or about 8,500 m$^3$/hr. The PSA unit 260 can have a typical hydrogen recovery (hydrogen in purified gas/hydrogen in feed gas to PSA) of about 70%, about 75%, or about 85% to about 90%, about 95%, or about 98%. The PSA unit 260 can have a typical nitrogen recovery (nitrogen in purified gas/nitrogen in feed gas to PSA) of about 5%, about 10%, or about 20% to about 30%, about 55%, or about 75%.

The waste gas via line 363 can be introduced to the reforming system 210 to be used as a fuel. The waste gas 363 can have a Btu rating of 800 Btu/lb, 650 Btu/lb, or 300 Btu/lb to about 1,500 Btu/lb, 1,800 Btu/lb, or 2,500 Btu/lb. The waste gas in line 363 can have a total energy of about 50 MMBtu/hr, about 100 MMBtu/hr, or about 200 MMBtu/hr to about 250 MMBtu/hr, about 350 MMBtu/hr, or about 450 MMBtu/hr.

The parallel PSA unit based purification of the second syngas can have exceeding pressure drop available compared to the carbon dioxide removal and methanation of the second syngas. Therefore, the equipment used to purify the second syngas can be sized with higher optimum allowable pressure drops. Lower than conventional catalyst volumes are used in the second HTSC 243, second LTSC 246, and second methanator 270 (described below). Obtaining ultra-low carbon monoxide slips, e.g., less than about 0.27%, in the second shift converter is not critical due to the new PSA unit. Additionally, the duty on the second methanator can be reduced due to relatively stable and lower carbon monoxide slip from the new PSA unit 260. Accordingly, the size of the equipment for purifying the second syngas, e.g., HTSC, LTSC, and methanator, can have different criteria than the conventional syngas systems. The equipment used in the HTSC, MTSC, and/or LTSC can have smaller than typical dimensions, allowing for higher pressure drops. In conventional scheme, pressure drop is limited and equipment is usually sized bigger to have lower pressure drop. However, smaller size equipment will cost less and result in an overall lower capital expenditure ("CAPEX") of the plant. Additionally, the methanator 270 and a feed-effluent exchanger, used for recovering heat from the methanator effluent 271, may be combined in one or more vessel for low CAPEX in some applications.

The purified second syngas in line 361 can have a carbon dioxide concentration of about 0 mol %, about 0.05 mol %, or about 0.1 mol % to about 0.15 mol %, about 0.2 mol %, or about 0.25 mol %. The purified second syngas in line 361 can have a carbon monoxide concentration of about 0 mol %, about 0.05 mol %, or about 0.1 mol % to about 0.15 mol %, about 0.2 mol %, or about 0.25 mol %. The purified second syngas in line 361 can have a hydrogen concentration of about 75 mol %, about 79 mol %, about 81 mol %, or about 85 mol % to about 88 mol %, about 93 mol %, about 97.5 mol %, or about 99.5 mol %. The purified second syngas in line 361 can have a nitrogen concentration of about 0.1 mol %, about 1 mol %, about 5 mol %, or about 10 mol % to about 15 mol %, about 18 mol %, about 20 mol %, or about 25 mol %. The purified second syngas in line 361 can have a argon concentration of about 0 mol %, about 0.5 mol %, about 0.8 mol %, or about 1 mol % to about 1.3 mol %, about 1.5 mol %, about 1.7 mol %, or about 2 mol %. The purified second syngas in line 361 can have a methane concentration of about 0 mol %, about 0.05 mol %, or about 0.1 mol % to about 0.15 mol %, about 0.2 mol %, or about 0.25 mol %. In one or more embodiments, the purified second syngas in line 361 can include up to about 0.1 mol % carbon dioxide, up to about 0.1 mol % carbon monoxide, about 95 mol % to about 99.5 mol % hydrogen, about 1 mol % to about 10 mol % nitrogen, and about 0.5 mol % to about 1 mol % argon. The purified second syngas in line 361 can have a hydrogen to nitrogen molar ratio of about 3:1 to about 12:1, about 4:1 to about 10.2:1, or about 4.3:1 to about 9.3:1.

In one or more embodiments, a portion of the second syngas leaving the PSA unit 260 can be introduced via line 365 to the second methanator 270 to produce a methanated second syngas via line 371. The second methanator 370 can be similar to the methanators discussed and described above with reference to FIGS. 1 and 2. The second methanator 270 can be operated at a temperature of about 200° C., about 225° C., about 250° C., or about 285° C. to about 315° C., about 350° C., about 375° C., or about 400° C.

The methanated second syngas in line 371 can have a hydrogen concentration of about 75 mol %, about 79 mol %, about 81 mol %, or about 85 mol % to about 90 mol %, about 95 mol %, about 97 mol %, or about 99.5 mol %. The methanated second syngas in line 371 can have a methane concentration of 0 mol %, about 0.05 mol %, or about 0.1 mol % to about 0.15 mol %, about 0.2 mol %, or about 0.25 mol %. The methanated second syngas in line 371 can have a carbon monoxide concentration of 0 mol %, about 0.05 mol %, or about 0.1 mol % to about 0.15 mol %, about 0.2 mol %, or about 0.25 mol %. The methanated second syngas in line 371 can have a carbon dioxide concentration of 0 mol %, about 0.05 mol %, or about 0.1 mol % to about 0.15 mol %, about 0.2 mol %, or about 0.25 mol %.

The methanated second syngas in line 371 can have a hydrogen to nitrogen molar ratio of about 2:1 to about 12:1, about 3:1 to about 10.2:1, or about 4.3:1 to about 9.3:1. In another example, the hydrogen to nitrogen molar ratio of the methanated second syngas in line 371 can be at least 3:1, at least 4.3:1, at least 9.7:1 or at least about 10.2:1. In another example, the hydrogen to nitrogen molar ratio of the methanated second syngas in line 371 can be more than 3:1, more than 5:1, more than 10:1, or more than 20:1.

In one or more embodiments, at least a portion of the second syngas via line 260 can bypass the second methanator 270 via line 364. In one or more embodiments, the syngas bypassing the second methanator 270 via line 364 can be mixed with the methanated second syngas in line 371 to produce the purified second syngas in line 367. The amount of the second syngas introduced to the second methanator 270 can be about 0 mol %, about 20 mol % or about 50 mol % to about 70 mol %, about 85 mol % to about 100 mol %. In one or more embodiments, all of the second syngas leaving the PSA unit 260 can bypass the second methanator 270 via line 364. Accordingly, the second methanator 270 can be absent from the system 300.

The methanated first syngas in line 356 and the purified second syngas in line 367 can be introduced to an ammonia synthesis unit 280 to produce one or more products, such as an ammonia product 381 and a purge gas 383. At least a portion of the methanated first syngas 356 and at least a portion of the purified second syngas 367 can be combined to produce an ammonia feedstock via line 375 prior to being introduced to the ammonia synthesis unit 380. The ammonia synthesis unit 280 can be the same as, or similar to, the ammonia synthesis unit discussed and described above with reference to FIGS. 1 and 2. Similarly, the purge gas 383 can be recycled as discussed and described above with reference to FIG. 2. The ammonia feedstock 375 can have a flow rate of about 500 m³/hr, about 2,000 m³/hr, or about 6,000 m³/hr to about 9,500 m³/hr, about 12,000 m³/hr, or about 30,000 m³/hr.

The ammonia feedstock in line 375 can have a hydrogen concentration of a 65 mol %, about 68 mol %, about 72 mol %, or about 74 mol % to about 76 mol %, about 80 mol %, about 83 mol %, or about 85 mol %. The ammonia feedstock in line 375 can have a nitrogen concentration of about 15 mol %, about 18 mol %, about 21 mol %, or about 24 mol % to about 25 mol %, about 27 mol %, about 30 mol %, or about 35 mol %. The ammonia feed stock in line 375 can have a hydrogen to nitrogen molar ratio of about 2.7:1, about 2.9:1, about 2.95:1, or about 3:1 to about 3.05:1, about 3.1:1, about 3.2:1, or about 3.4:1. In one or more embodiments, the ammonia feedstock in line 375 can include about 68 mol % to about 74 mol % hydrogen, up to about 0.05 mol % carbon monoxide, up to about 0.05 mol % carbon dioxide, and can have a hydrogen to nitrogen molar ratio of about 2.95:1 to about 3.05:1.

The ammonia synthesis unit 280 can produce an ammonia product via line 381 which can have an ammonia concentration of about 95 mol %, about 98 mol %, about 99.5 mol %, or about 99.9 mol % to about 99.95 mol %, about 99.99 mol %, about 99.999 mol %, or about 100 mol %. The ammonia product in line 381 can have a hydrogen concentration of about 0 mol %, about 0.01 mol %, about 0.02 mol %, or about 0.05 mol % to about 0.1 mol %, about 0.2 mol %, about 0.3 mol %, or about 0.5 mol %. The ammonia product in line 381 can have a nitrogen concentration of about 0 mol %, about 0.01 mol %, about 0.02 mol %, or about 0.05 mol % to about 0.1 mol %, about 0.2 mol %, about 0.3 mol %, or about 0.5 mol %.

The purge gas 383 can be recycled to the system 300 as discussed and described with reference to FIG. 2. The purge gas in line 383 can have a heating value of about 5,000 BTU/lb, about 7,500 BTU/lb, or about 8,500 BTU/lb to about 9,000 BTU/lb, about 10,000 BTU/lb, or about 12,000 BTU/lb.

The system illustrated in FIG. 3 can have major operating benefits, Quality of the total ammonia synthesis makeup gas, e.g., hydrogen to nitrogen ratio, can be adjusted quickly. In addition, in the event an upset occurs in the purification of the first syngas, the flow split can be adjusted to increase the amount of second syngas delivered to the PSA unit. In the event adverse conditions occur in any critical equipment, parameters can be adjusted to accommodate the system and avoid a complete shutdown. The system 300 illustrated in FIG. 3 is expected to provide higher cumulative ammonia production on life cycle basis. The PSA Unit can be used for rejection the excess nitrogen fed to the secondary reformer, alone or in conjunction with the use of excess air to reject nitrogen with a feed gas having a hydrogen to nitrogen molar ratio of 2:1 to 2.8:1 or lower than 2:1. Other known cryogenic nitrogen rejection processes require a maximum allowable a hydrogen to nitrogen molar ratio, whereas the PSA unit can provide more flexibility to operate in wider ranges of hydrogen and nitrogen concentrations.

The systems 100, 200 and/or 300 can be built as a new or grass-roots facility. In other words, the systems 100, 200, and/or 300 can be built from the ground up. The systems 100, 200, and/or 300 can be provided by modifying, retrofitting, or revamping an existing syngas production system. For example, the systems 100, 200, and/or 300 can be provided by revamping an existing integrated syngas and ammonia production system.

A revamped existing facility or a new facility that includes the primary reformer 212 the first secondary reformer 216, the second secondary reformer 220, and the reforming exchanger 218, and the PSA unit 260, can increase the syngas production via lines 356, 367 by 15% to 100%. Any syngas production system can be revamped to include the reforming exchanger, the second shift converter, PSA unit, and the second methanator, as discussed and described above with reference to FIGS. 1, 2, and 3. For example, an existing SMR and ATR syngas production system that produces hydrogen, Fischer-Tropsch products, methanol, ammonia, urea, or the like, can be revamped to provide the PSA unit. A revamped existing facility or a new facility that includes the primary reformer, the ATR, the reforming exchanger, and the PSA unit can increase the syngas production via lines 356, 367 from about 15% to about 100%. It was surprising and unexpected to find that adding a PSA unit and/or a second methanator to and existing syngas purification and ammonia synthesis system requires a minimal shutdown time of about 21 days. Such a minimal shutdown time will be desirable to operators because it reduces the monetary risk associated with building an entirely new system, while resuming ammonia production before experiencing large upfront momentary loss.

Figure 4:
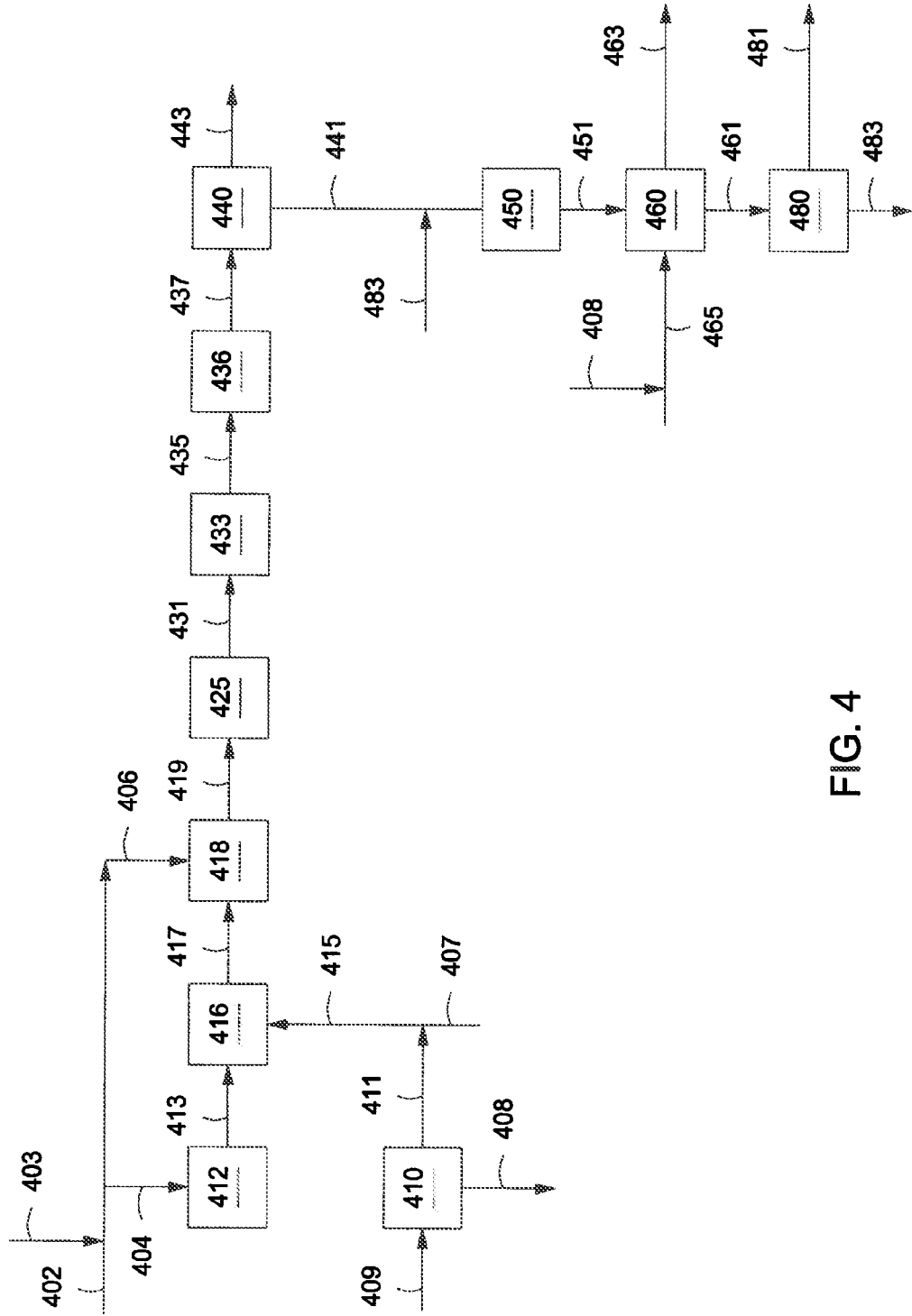
FIG. 4 depicts a schematic of yet another illustrative system for producing syngas, according to one or more embodiments described.

FIG. 4 depicts schematic of an illustrative system 400 for producing a syngas and ammonia therefrom, according the one or more embodiments described. One or more hydrocarbons via line 402 can be divided, apportioned, split, or otherwise separated into a first hydrocarbon 404 and a second hydrocarbon 406. Although not shown, the first hydrocarbon 404 and the second hydrocarbon 406 can come from different sources. As such the first hydrocarbon 404 and the second hydrocarbon 406 can have the same composition, substantially the same composition, or different compositions with respect to one another.

The first hydrocarbon in line 404 can be reformed in the presence of steam 403 and/or one or more first catalysts in a primary reformer 412 to produce a first effluent 413. The first effluent 413 can be further reformed in the presence of one or more second catalysts and an oxidant via line 415 in a secondary reformer 416 to produce a second effluent 417. For example, the effluent 413 can be introduced to the secondary reformer 416 which can be an ATR. The oxidant in line 415 can be excess process air, air with increased oxygen content, pure oxygen, oxygen-rich air, or a mixture thereof. The oxidant can be received from a source external to the system via line 407. The oxidant can be produced in an air separation unit (ASU) 410. The ASU separate the air stream into an oxygen-rich stream 411 and a nitrogen-rich stream 408. The oxidant in line 415 can include at least a portion of the oxidant in line 407 and/or at least a portion of the oxygen-rich stream in line 411.

The ASU 410 can receive an air stream 409 and separate at least a portion of the nitrogen, oxygen, and/or other components from the air to produce an oxygen-rich stream 411 and a nitrogen-rich stream 408. The oxygen enriched air can include about 99.9 vol % oxygen to about 35 vol % oxygen or 99.9 vol % oxygen to about 55 vol % oxygen. Air 409 introduced to the ASU 410 cab be supplied by a compressor. Oxygen and/or nitrogen supplied to the ASU 410 can be supplied by OSBL through a cryogenic unit or from other sources that produce oxygen and nitrogen.

The oxygen-rich stream in line 411 have an oxygen concentration of about 35 mol %, about 50 mol %, or about 75 mol % to about 85 mol %, about 95 mol %, or about 99.9 mol %. The term "oxygen-rich air" can be described as an air stream having at least 20 mol % oxygen, at least 25 mol % oxygen, at least 35 mol % oxygen, or at least 55 mol % oxygen. The oxidant in line 411 can have a nitrogen concentration that is lower than the excess air in line 409. The oxidant in line 415 can have a nitrogen concentration of about 0 mol %, about 35 mol %, about 50 mol %, or about 60 mol % to about 70 mol %, about 73 mol %, about 78 mol %, or about 80 mol %. The oxidant in line 415 can have a nitrogen concentration of less than 1 mol %, less than 10 mol %, less than 50 mol %, or less than 78 mol %.

The oxidant introduced to the secondary reformer 416 can be heated via the heating coil disposed in the exhaust duct of the primary reformer 412. The secondary reformer 416 can be operated at a temperature of about 1,200° C., about 1,275° C., about 1,350° C., or about 1,425° C. to about 1,475° C., about 1,500° C., about 1,525° C., or about 1,600° C. In one or more embodiments, a portion of the oxygen-rich air in line 415 can be compressed to a pressure of about 2,000 kPa, about 2,750 kPa, about 3,250 kPa, or about 3,600 kPa to about 3,800 kPa, about 4,000 kPa, about 4,500 kPa, or about 5,500 kPa. At least 100%, at least 90%, at least 85%, at least 60%, or at least 45% of the oxygen-rich air can be compressed prior to being introduced to the secondary reformer 416.

The oxidant introduced via line 415 can be used to partially combust a portion of the effluent introduced via line 413 to provide heat that drives an endothermic reforming reaction within one or more catalyst beds disposed within the secondary reformer 416. An incremental increase in supply of oxygen enriched air via 415 can provide maximum incremental capacity to the secondary reformer 416. In one or more embodiments, the flow rate of nitrogen to the secondary reformer 416 can be gradually or incrementally reduced and, simultaneously, the flow rate of oxygen can be gradually or incrementally increased. An increase in oxygen flow to the secondary reformer 416 can also provide the heat balance needed downstream, e.g., production of syngas to meet ammonia capacity targets. A decrease in nitrogen flow in the syngas production equipment can result in an increased capacity for each unit of the system 400 without drastically increasing the flow of feed through those units.

Steam can be introduced to the oxidant in line 415 (not shown) and/or to a preheated oxidant to produce an oxidant and steam mixture. The amount of steam introduced to the oxidant in line 415 can produce an oxidant that includes about 0.1 vol %, about 1 vol %, about vol %, about 15 vol %, or about 30 vol % steam. Although not shown, steam can be introduced directly to the secondary reformer 416, rather than to the oxidant in line 415.

The second hydrocarbon 406 and/or the second effluent 417 can be further reformed in the reform exchanger 418 to produce a raw syngas 419. The raw syngas 419 can be introduced to a waste heat boiler 425 to produce a cooled raw syngas 431. The cooled raw syngas 431 can be introduced to a shift converter to convert at least a portion of the carbon monoxide in the raw syngas to carbon dioxide thereby producing a shifted syngas 437. The shift converter can include an HTSC 433, MTSC (not shown), LTSC 436, or any combination thereof, which can be as discussed and described with reference to FIG. 2. The shifted syngas 437 can be introduced to a carbon dioxide removal unit 440 to produce a carbon dioxide-lean syngas 441.

The carbon dioxide-lean syngas can remove or separate at least a portion of the water in the carbon dioxide-lean syngas in the drier 450 to produce a dried syngas 451. For example, the one or more dries 450 can remove or separate most, e.g., greater than about 100% of the water from the carbon dioxide-lean syngas. The one or more driers 450 can include, but are not limited to one or more molecular sieves, absorbents, adsorbents, flash tank separators, incinerators, or any combination thereof. Suitable absorbents can include, but are not limited to, glycol, alkali-earth halide salts, derivatives thereof, or mixtures thereof. Suitable adsorbents can include but are not limited to, activated alumina, silica gel, molecular sieves, activated carbon, derivatives thereof, or mixtures thereof.

The dried syngas 451 can be treated in a nitrogen wash unit 460 to produce an ammonia feedstock 461, where nitrogen can be used to wash contaminants from the syngas while providing the additional nitrogen needed to adjust the hydrogen-nitrogen ratio used in the ammonia synthesis loop. The nitrogen wash unit 460 can be operated at a temperature of about −190° C., about −180° C., about −165° C., or about −125° C. to about 1° C., about 15° C., about 40° C., or about 65° C. The nitrogen wash unit 460 can be operated at a pressure of about 2,000 kPa, about 2,500 kPa, about 2,700 kPa, or about 2,800 kPa to about 3,200 kPa, about 3,600 kPa, about 4,500 kPa, or about 5,500 kPa. The nitrogen wash unit can process the syngas at a flow rate of about 1,000 $m^3$/hr, about 3,000 $m^3$/hr, or about 5,000 $m^3$/hr to about 8,000 $m^3$/hr, about 15,000 $m^3$/hr, or about 20,000 $m^3$/hr.

The contaminants can include argon, methane, carbon monoxide, carbon dioxide, nitrogen, or any combination thereof, and can be removed as a waste gas via line 463. The waste gas 463 can be recycled to the primary reformers 412 to be used as a fuel and/or used as a fuel in a power plant or other fuel using system external to the system 400. The nitrogen wash unit 460 can be configured to receive a nitrogen-rich stream from the ASU 410 via line 408, a second ASU (not shown), and a nitrogen source external to the system 400, or any combination thereof.

The nitrogen-rich stream 465 can include air or liquid with an increased nitrogen content, pure nitrogen, nitrogen enriched stream, or any mixture thereof. The nitrogen can be provided, produced, or otherwise obtained from any suitable source located within the system 400 or from outside the system 400, e.g., ISBL or OSBL. The nitrogen-rich stream can be produced in the ASU 410 and introduced via line 408 or in a second ASU (not shown). The nitrogen-rich stream can have a nitrogen concentration of about 95 mol %, about 97 mol %, about 98 mol %, or about 99 mol % to about 99.5 mol %, about 99.99 mol %, about 99.999 mol %, or about 100 mol %. The term "nitrogen enriched stream" can mean a stream having at least 95 mol % nitrogen, at least 99 mol % nitrogen, at least 99.5 mol % nitrogen, or at least 99.99 mol % nitrogen. The nitrogen-rich stream in line 465 can have an oxygen concentration of less than about 1 ppm, less than about 5 mol %, or less than about 2 ppm. The nitrogen-rich stream in line 465 can be at a temperature of about −185° C., about −175° C., about −145° C., or about 1° C. to about 15° C., about 30° C., about 40° C., or about 65° C.

Referring again to the hydrocarbon, prior to separating the hydrocarbon in line 402, the hydrocarbon can be preheated in one or more heat transfer zones (not shown). Prior to separating the hydrocarbon in line 402, the hydrocarbon can be desulfurized in one or more desulfurization units (not shown). Steam 403 can be introduced to the hydrocarbon in line 402, the first hydrocarbon in line 404, and/or to the second hydrocarbon in line 406. The first hydrocarbon in line 404 and the second hydrocarbon in line 406 can have a steam to carbon molar ratio (or steam to carbon content of the first hydrocarbon) of about 2:1, about 2.5:1, about 2.8:1, or about 3:1 to about 3.1:1, about 3.3:1, about 18:1, about 4.5:1, or about 5.5:1. Introducing the steam to the first hydrocarbon and the second hydrocarbon can produce or allow for different hydrocarbon-to-steam molar ratios between the first hydrocarbon in line 404 and the second hydrocarbon in line 406. For example, the first hydrocarbon in line 404 can have a steam to carbon molar ratio of from about 5:1 to about 2.3:1 and the second hydrocarbon in line 406 can have a steam to carbon molar ratio of from about 5:1 to about 2.3:1.

Although not shown, hydrogen can be introduced to the first hydrocarbon in line 404 and/or the second hydrocarbon in line 406. The hydrogen can be provided, produced, or otherwise obtained from any suitable source located within the system 400 or from outside the system 400, e.g., ISBL or OSBL. For example, at least a portion of the hydrogen that can be introduced to the hydrocarbon in line 402, the first hydrocarbon in line 404, and/or the second hydrocarbon in line 406 can be produced from one or more downstream purge gases. For example, the first hydrocarbon in line 404 can have a hydrogen concentration ranging from about 0 mol % to about 15 mol % and the second hydrocarbon in line 406 can have a hydrogen concentration ranging from about 0 mol % to about 15 mol %.

The first hydrocarbon in line 404 can be or include from about 90 vol % to about 60 vol % of the total amount of the hydrocarbon in line 402. The second hydrocarbon in line 406 can be or include from about 40 vol % to about 10 vol % of the total amount of the hydrocarbon in line 402. For example, the first hydrocarbon in line 404 can be or include from about 90 vol % to about 70 vol % of the total amount of the hydrocarbon in line 402 and the second hydrocarbon in line 406 can be or include from about 30 vol % to about 10 vol % of the total amount of the hydrocarbon in line 402. In another example, the amount of the first hydrocarbon in line 404 can be about equal to or up to about 9 times more than the amount of the second hydrocarbon in line 406. As such, the first hydrocarbon in line 404 and the second hydrocarbon in line 406 can be different from one another, derived from different sources, or the like.

The hydrocarbon in line 402 can include one or more liquid or gaseous hydrocarbons, or any mixture thereof. In one or more embodiments, the hydrocarbon can include hydrogen, nitrogen, methane, ethane, propane, butane, or any mixture thereof. The hydrocarbon in line 402 can have a hydrogen concentration of 0 mol %, about 1 mol %, about 2 mol %, or about 5 mol % to about 8 mol %, about 12 mol %, about 16 mol %, or about 20 mol %. The hydrocarbon in line 402 can have a methane concentration of about 50 mol %, about 65 mol %, about 75 mol %, or about 80 mol % to about 85 mol %, about 88 mol %, about 90 mol %, or about 100 mol %. The hydrocarbon in line 402 can have a $C_2$-$C_3$ concentration of 0 mol %, about 5 mol %, about 10 mol %, or about 12 mol % to about 15 mol %, about 18 mol %, about 21 mol %, or about 25 mol %. The hydrocarbon in line 402 can have a $C_4$ and higher concentration of 0 mol %, about 2 mol %, about 4 mol %, or about 6 mol % to about 8 mol %, about 10 mol %, about 12 mol %, or about 15 mol %.

The first hydrocarbon in line 404 can be reformed in the presence of steam and/or one or more first catalysts in a primary reformer 412 to produce a first effluent 413. The primary reformer 412 can be as discussed and described above with reference to FIG. 2. The primary reformer can operate at a temperature of from about 650° C. to about 850° C., for example from about 680° C. to about 820° C., and can have a heat output of from about 200 MMBtu/hr to about 400 MMBtu/hr, for a 1500 t/d ammonia plant. In one or more embodiments, about 5% or more, about 15% or more, about 20% or more, or about 50% or more of the heat produced within the primary reformer 412 can be used to reform the first hydrocarbon introduced via line 404.

The first effluent in line 413 can include hydrogen, nitrogen, carbon monoxide, carbon dioxide, methane, or any mixture thereof. The first effluent in line 413 can include an increased amount of hydrogen and a decreased amount of methane as compared to the first hydrocarbon in line 404. The first effluent in line 413 can have a hydrogen concentration of about 50 mol %, about 55 mol %, about 59 mol %, or about 61 mol % to about 65 mol %, about 70 mol %, about 75 mol %, or about 80 mol %. The first effluent 413 can have a nitrogen concentration of about 0 mol %, about 0.1 mol %, about 0.3 mol %, or about 0.5 mol % to about 1 mol %, about 2 mol %, about 5 mol %, or about 10 mol %. The first effluent in line 413 can have a methane concentration of about 7 mol %, about 10 mol %, about 15 mol %, or about 20 mol % to about 22 mol %, about 25 mol %, about 27 mol %, or about 30 mol %. The first effluent in line 413 can have a carbon monoxide concentration of about 3 mol %, about 5 mol %, about 6 mol %, or about 7 mol % to about 9 mol %, about 11 mol %, about 13 mol %, or about 15 mol %. The first effluent in line 413 can have a carbon dioxide concentration of about 8 mol %, about 10 mol %, about 12 mol %, or about 14 mol % to about 16 mol %, about 18 mol %, about 20 mol %, or about 22 mol %. The first effluent in line 413 can have components such as $C_2$ and heavier hydrocarbons absent or minimally present, for example at less than about 1 mol %, or less than about 0.5 mol %.

The first effluent in line 413 can be at a temperature of about 650° C., about 675° C., about 700° C., or about 725° C. to about 740° C., about 750° C., about 775° C., or about 850° C. The pressure of the first effluent in line 413 can range from about 2,000 kPa, about 2,500 kPa, about 3,000 kPa, or about 3,250 kPa to about 3,500 kPa, about 3,750 kPa, about 4,500 kPa, or about 5,500 kPa.

The second effluent in line 417 produced by the secondary reformer 416 can include hydrogen, carbon monoxide, carbon dioxide, nitrogen, and other minor components, such as argon and/or methane. The secondary reformer 416 can be as discussed and described above with reference to FIG. 2. The second effluent in line 417 can have a hydrogen concentration of about 35 mol %, about 45 mol %, about 50 mol %, or about 55 mol % to about 58 mol %, about 60 mol %, about 65 mol %, or about 75 mol %. The second effluent in line 417 can have a methane concentration of about 0.05 mol %, about 0.1 mol %, about 0.2 mol %, or about 0.3 mol % to about 0.8 mol %, about 1 mol %, about 1.5 mol %, or about 2 mol %. The second effluent in line 417 can have a carbon monoxide concentration of about 7 mol %, about 10 mol %, about 13 mol %, or about 14 mol % to about 15 mol %, about 16 mol %, about 18 mol %, or about 20 mol %. The second effluent in line 417 can have a carbon dioxide concentration of about 4 mol %, about 10 mol %, about 13 mol %, or about 14 mol % to about 15 mol %, about 16 mol %, about 18 mol %, or about 20 mol %.

The second effluent in line 417 can be at a temperature of about 800° C., about 900° C., about 975° C., or about 1,000° C. to about 1,025° C., about 1,050° C., about 1,100° C., or about 1,150° C. The pressure of the second effluent in line 417 can range from about 2,000 kPa, about 2,500 kPa, about 3,000 kPa, or about 3,250 kPa to about 3,500 kPa, about 3,750 kPa, about 4,500 kPa, or about 5,500 kPa.

The reforming exchanger 418 can reform the second hydrocarbon 406 and/or the second effluent in line 417 at a rate of about 500 m$^3$/hr, about 1,500 m$^3$/hr, about 2,000 m$^3$/hr, or about 2,500 m$^3$/hr, to about 2,800 m$^3$/hr, about 3,500 m$^3$/hr, about 4,500 m$^3$/hr, or about 6,000 m$^3$/hr. The one or more reforming exchangers 410 can include a KBR Reforming Exchanger System. The reforming exchanger 410 can be as discussed and described above with reference to FIG. 2.

The second hydrocarbon via line 406 can be introduced to a tube-side inlet of the reforming exchanger 418 to produce the raw syngas via an exit from one or more catalyst-including tubes within the reforming exchanger 418. In one or more embodiments, the second hydrocarbon in line 406 can be heated prior to entering the reforming exchanger 418. For example, the second hydrocarbon via line 406 can be introduced to a heating coil disposed within the exhaust duct of the primary reformer 412 to produce a heated second hydrocarbon. The heated second hydrocarbon in line 406 can be at a temperature of about 400° C., about 435° C., about 475° C., or about 505° C. to about 515° C., about 525° C., about 550° C., or about 600° C.

Heat required for endothermic reforming reactions within catalyst-containing tubes of the reforming exchanger 418 can be provided from the second effluent 417. The second effluent introduced via line 417, either alone or mixed or otherwise combined with the second hydrocarbon 406, can flow along the outside of the one or more catalyst-containing tubes, thereby indirectly transferring heat from the second effluent to the second hydrocarbon.

The raw syngas in line 419 produced by the reforming exchanger 418 can include methane, ethane, propane, butane, pentane, hexane, hydrogen, nitrogen, or any mixture thereof. The raw syngas in line 419 can have a hydrogen concentration of about 40 mol %, about 45 mol %, about 50 mol %, or about 55 mol % to about 60 mol %, about 62 mol %, about 67 mol %, or about 75 mol %. The raw syngas in line 419 can have a methane concentration of about 0.2 mol %, about 0.3 mol %, about 0.4 mol %, or about 0.5 mol % to about 0.6 mol %, about 0.7 mol %, about 0.8 mol %, or about 1 mol %. The raw syngas in line 419 can have a carbon monoxide concentration of about 8 mol %, about 10 mol %, about 12 mol %, or about 14 mol % to about 16 mol %, about 18 mol %, about 20 mol %, or about 22 mol %. The raw syngas in line 419 can have a carbon dioxide concentration of about 3 mol %, about 5 mol %, about 7 mol %, or about 8 mol % to about 9 mol %, about 11 mol %, about 15 mol %, or about 20 mol %.

The raw syngas in line 419 can be at a temperature of about 700° C., about 735° C., about 775° C., or about 785° C. to about 800° C., about 820° C., about 860° C., or about 900° C. The pressure of the raw syngas in line 419 can range from about 2,000 kPa, about 2,500 kPa, about 3,000 kPa, or about 3,250 kPa to about 3,300 kPa, about 3,650 kPa, about 4,500 kPa, or about 5,500 kPa. The raw syngas in line 419 can have a hydrogen to nitrogen molar ratio of about 3:1 to about 200:1, about 4:1 to about 150:1, or about 5:1 to about 100:1.

The cooled syngas 431 produced by the waste heat boiler 425 can be introduced to a shift converter to produce a shifted syngas 437. As shown in FIG. 4, the shift converter can include the HTSC 433, the MTSC (not shown), the LTSC 436, or any combination thereof. The HTSC 433, the MTSC (not shown), the LTSC 436 can be as discussed and described with reference to FIG. 2. At least a portion of the cooled raw syngas 431 can be introduced to the HTSC 433. At least a portion of the syngas leaving the HTSC 423 can be introduced to the LTSC 436 via line 435. In one or more embodiments, at least a portion of the cooled syngas 431 can be introduced to the HTSC, MTSC, and/or LTSC in any order and/or combination thereof.

The HTSC 433, MTSC (not shown), and/or LTSC 436 can convert carbon monoxide in the syngas to carbon dioxide by reacting the carbon monoxide in the presence of one or more catalysts, at a temperature sufficient to oxidize the carbon monoxide. The catalyst within the HTSC 443 can include, but is not limited to, iron oxide, zinc ferrite, magnetite, chromium oxides, derivatives thereof, or any mixture thereof. The HTSC 443 can be operated at a temperature of from about 300° C. to about 450° C., or from about 350° C. to about 400° C. The catalyst within the MTSC can include, but is not limited to, iron oxide, chromium oxide, derivatives thereof, or any mixture thereof. The MTSC can be operated at a temperature of from about 200° C. to about 350° C., or from about 250° C. to about 300° C. The catalyst within the LTSC 446 can include, but is not limited to, copper, zinc, copper promoted chromia, derivatives thereof, or any mixture thereof. The LTSC 446 can be operated at a temperature of from about 180° C. to about 250° C., or from about 190° C. to about 225° C.

The shifted syngas in line 437 can be introduced to one or more carbon dioxide removal units 440 to remove at least a portion of the carbon dioxide contained therein. The carbon dioxide removal unit 440 can be the carbon dioxide removal unit as discussed and described above with reference to FIG. 2.

The carbon dioxide removal unit 440 can produce a carbon dioxide-lean syngas via line 441 and a carbon dioxide product via line 443. The carbon dioxide-lean syngas in line 441 can have a hydrogen concentration of about 60 mol %, about 70 mol %, about 80 mol %, or about 82 mol % to about 83 mol %, about 85 mol %, about 95 mol %, or about 100 mol %. The carbon dioxide-lean syngas in line 441 can have a nitrogen concentration of about 0 mol %, about 5 mol %, about 10 mol %, or about 15 mol % to about 17 mol %, about 20 mol %, about 25 mol %, or about 35 mol %. The carbon dioxide-lean syngas in line 441 can have a carbon dioxide concentration of about 0 mol %, about 0.001 mol %, about 0.005 mol %, or about 0.01 mol % to about 0.05 mol %, about 0.1 mol %, about 0.15 mol %, or about 0.2 mol %. The carbon dioxide-lean syngas in line 441 can have a carbon monoxide concentration of about 0 mol %, about 0.001 mol %, about 0.005 mol %, or about 0.01 mol % to about 0.05 mol %, about 0.1 mol %, about 0.15 mol %, or about 0.2 mol %. The carbon dioxide-lean syngas in line 441 can have a hydrogen to nitrogen molar ratio of about 3.5:1 to about 150:1, about 4.9:1 to about 100:1, or about 9.4:1 to about 80:1.

The carbon dioxide-lean syngas 441 can be optionally compressed and introduced to the nitrogen wash unit 460 to produce the ammonia feedstock 461 as discussed and described above. The ammonia feedstock in line 461 can have a hydrogen concentration of about 65 mol %, about 70 mol %, about 72 mol %, or about 74 mol % to about 75 mol %, about 76 mol %, about 78 mol %, or about 80 mol %. The ammonia feedstock in line 461 can have a nitrogen concentration of about 20 mol %, about 22 mol %, about 24 mol %, or about 25 mol % to about 26 mol %, about 27 mol %, about 28 mol %, or about 30 mol %. The ammonia feedstock in line 461 can have a hydrogen to nitrogen molar ratio of about 2, 5:1 to about 3.5:1, about 2.8:1 to about 3.2:1, or about 2.9:1 to about 3:1.

The ammonia feedstock via line 461 can be introduced to an ammonia synthesis unit 480 to produce one or more products, such as an ammonia product 481 and a purge gas 483. The ammonia synthesis unit 480 can be conventional single or multi-pass converters using one or more magnetite catalysts. The ammonia synthesis unit 480 can be single or multi-pass converters using one or more noble metal catalysts, or one or more catalysts based upon ruthenium, such as the ruthenium-based KAAP catalyst available from KBR. The ammonia synthesis unit 480 can include an ammonia condenser having any mechanical or chemical system capable of selectively separating ammonia from a gas mixture including at least hydrogen and nitrogen. The ammonia condenser can include one or more cryogenic purifiers including one or more refrigeration exchangers and one or more refrigeration compressors. The ammonia synthesis unit 480 can be as discussed and described above with reference to FIG. 2.

The purge gas via line 483 can be recycled to one or more feeds within the system 400. Separated or recovered argon can be vented to the atmosphere, sold as a by-product, or otherwise disposed. Though not shown, the purge gas 483 can be introduced to an argon recovery unit to produce a separated argon feed and an argon-lean purge gas. In one or more embodiments, an argon recovery unit can be absent from the system 400 and the purge gas via line 483 can be introduced to the carbon dioxide-lean syngas in line 441. A hydrogen-rich product can be recovered from a purge gas recovery unit (not shown), which can be recycled within the ammonia synthesis unit 480.

The system 400 having the above described arrangement of the primary reformer 412, secondary reformer, 416, reforming exchanger 418, HTSC 433, LTSC 436, carbon dioxide removal unit 440, drier 450, nitrogen wash unit 460, and ammonia synthesis unit 480 provides surprising and unexpected benefits over existing systems. It is surprising and unexpected to find that no methanator is needed in the system to convert remaining carbon dioxide and carbon monoxide remaining in the carbon dioxide-lean syngas to methane. This is especially beneficial when considering the hydraulic restriction associated with a methanator.

The system 400 can be built as a new or grass-roots facility. In other words, the system 400 can be built from the ground up. The system 400 can be provided by modifying, retrofitting, or revamping an existing syngas production system. For example, the system 400 can be provided by revamping an existing integrated syngas and ammonia production system.

A revamped existing facility or a new facility that includes the ASU 410, drier 450, and nitrogen wash unit 460, can increase the syngas production via line 481 by 10% to 200% or by 30% to 100%. Any syngas production system can be revamped to include the reforming exchanger, the ASU, and/or the nitrogen wash unit, as discussed and described above with reference to FIG. 4. For example, an existing SMR and ATR syngas production system that produces hydrogen, Fischer-Tropsch products, methanol, ammonia, urea, or the like, can be revamped to provide the ASU and nitrogen wash unit.

It is surprising and unexpected to find that adding an ASU and nitrogen wash unit to and existing syngas purification and ammonia synthesis system requires a minimal shutdown time of about 15 days, about 21 days, or about 28 days. Such a minimal shutdown time will be desirable to operators because it reduces monetary risk associated with building an entirely new system, and in a revamp, ammonia production can resume before large economic loss occurs.

Prophetic Examples

In order to provide a better understanding of the foregoing discussion, the following non-limiting simulated examples are offered. Although the examples may be directed to specific embodiments, they are not to be viewed as limiting the invention in any specific respect. All parts, proportions, and percentages are by volume unless otherwise indicated. The examples below are compared to one of two methods for producing a syngas for ammonia synthesis that are known in the art, hereinafter referred to as "Control Example 1" and "Control Example 2," respectively.

Tables 1 and 2 show simulated process results for the Control Example 1, in which a hydrocarbon is introduced to a primary reformer, and a secondary reformer to produce a syngas. The syngas in the Control Example 1 is introduced to a high temperature shift converter ("HTSC"), low temperature shift converter ("LTSC"), carbon dioxide removal unit, and a methanator to produce an ammonia synthesis makeup gas. Examples 1 and 2 are modifications to the Control Example 1. Example 1 illustrates the use of PSA unit for syngas purification along with a methanator, the capacity increase is targeted to 150% capacity of Control Example 1. Example 2 illustrates the use of a PSA unit with a methanator and a targeted capacity increase of 200% of control case capacity. Examples 3 and 4 are also modifications to the Control Example 1. Example 3 includes use of parallel secondary reformer for syngas generation and use of a PSA unit with no methanator used for syngas purification. Example 4 includes the use of a PSA unit, also with no methanator for purification of syngas.

TABLE 1

| | Units of Measurement | Control Example 1 | EXAMPLE 1 Scheme 1 PSA added Revamp | EXAMPLE 2 Scheme 1 PSA added Revamp MAX |
|---|---|---|---|---|
| Overall S/C | | 3.3 | 3.1 | 3.1 |
| | | Base = 100 | % Base | % Base |
| Ammonia Produced | STPD | 1,436 | 150 | 196 |
| NG Feed Flow | | | | |
| Mass | kg/hr | 25,246.9 | 157 | 219 |
| Volume | m$^3$/hr | 813.6 | 157 | 219 |
| Total compressed Air flow | | | | |
| Mass Airflow/total | kg/hr | 64,451.4 | 160 | 245 |
| Volume airflow/total | m$^3$/hr | 2444.7 | 160 | 245 |
| Air Compressor Power | hP | 13,823.9 | 159 | 243 |
| Primary Reformer Mixed Feed | | | | |
| Mass Flow | kg/hr | 111,485.3 | 122.4 | 170.3 |
| Volume Flow | m$^3$/hr | 6,728.3 | 121.7 | 173.9 |
| KRES Feed Split ratio | | | | |
| Radiant Duty (X) | MMBtu/hr | −280.75 | 112.0 | 136.6 |
| Primary Reformer Outlet | | | | |
| Temperature | °C. | 797.0 | 770.0 | 740.0 |
| Mass Flow | kg/hr | 111,485.3 | 122.4 | 170.3 |
| Volume Flow | m$^3$/hr | 22,020.1 | 116.8 | 153.4 |
| CH$_4$ Slip | % mol dry | 12.80% | 16.80% | 20.76% |
| Secondary Reformer Outlet | | | | |
| Flame Temp. | °C. | 1,279.3 | 1,369.2 | |
| Temperature | °C. | 985.5 | 1,015.5 | 1001.2 |
| Mass Flow | kg/hr | 178,754.9 | 135.7 | 196.1 |
| Volume Flow | m$^3$/hr | 36,217.2 | 132.9 | 185.8 |
| CH$_4$ Slip | % mol dry | 0.40% | 0.20% | 0.21% |
| CO Conc. | % mol dry | 12.99% | 12.84% | 12.29% |
| KRES Outlet/WHB Inlet | | | | |
| Temperature | °C. | 985.5 | 790.6 | 784.5 |
| Mass Flow | kg/hr | 178,754.9 | 153.6 | 221.0 |
| Volume Flow | m$^3$/hr | 36,217.2 | 122.6 | 171.6 |
| HTSC Outlet (Before Flow Split) | | | | |
| Temperature | °C. | 435.1 | 429.2 | 426.9 |
| Mass Flow | kg/hr | 178,754.9 | 153.6 | 221.0 |
| Volume Flow | m$^3$/hr | 20,976.7 | 152.1 | 213.5 |
| CO Slip | % mol dry | 3.44% | 3.50% | 3.28% |
| New PSA | | | | |
| Flow Split fraction (of Total flow) to PSA | | | 23.0% | 54.0% |
| H/N molar ratio of purified second syngas | | | 4.35 | 3.84 |
| PSA Unit Recoveries: | | | | |
| H$_2$ | | | 85.0% | 85.0% |
| N$_2$ | | | 55.0% | 55.0% |
| Fuel Balance | | | | |
| Waste Gas (PSA) fuel LHV | Btu/lb | | 1,817.4 | 1,243.2 |
| Waste Gas Total Energy (Y) | MMBtu/hr | | 151.7 | 313.0 |
| WG fuel % of Radiant Arch duty (Y/X) | % | | 48.2% | 81.6% |
| Typical Radiant Efficiency | % | | 45-52% | 45-52% |

TABLE 1-continued

| | Units of Measurement | Control Example 1 | EXAMPLE 1 Scheme 1 PSA added Revamp | EXAMPLE 2 Scheme 1 PSA added Revamp MAX |
|---|---|---|---|---|
| EXISTING LTSC Outlet | | | | |
| Temperature | ° C. | 231.7 | 225.9 | 224.1 |
| Mass Flow | kg/hr | 180,143.8 | 117.4 | 100.9 |
| Volume Flow | m$^3$/hr | 16,008.4 | 116.0 | 97.2 |
| CO Slip | % mol dry | 0.27% | 0.3% | 0.2% |
| CO$_2$ Absorber Inlet | | | | |
| Temperature | ° C. | 61.7 | 61.7 | 61.7 |
| Mass Flow | kg/hr | 126,803.1 | 121.8 | 104.8 |
| Volume Flow | m$^3$/hr | 8,085.2 | 120.9 | 101.1 |
| CO$_2$ Conc. | % mol dry | 17.85% | 17.8% | 17.6% |
| CO$_2$ Absorber Outlet | | | | |
| Temperature | ° C. | 48.3 | 48.3 | 48.3 |
| Mass Flow | kg/hr | 60,768.7 | 124.2 | 111.0 |
| Volume Flow | m$^3$/hr | 6,388.3 | 121.3 | 101.6 |
| Methanator Outlet | | | | |
| Temperature | ° C. | 28.9 | 28.9 | 28.9 |
| Mass Flow | kg/hr | 60,768.7 | 124.2 | 111.0 |
| Volume Flow | m$^3$/hr | 6,528.1 | 120.5 | 101.1 |
| Stream 1 makeup gas H/N Molar ratio | | 2.81 | 2.7 | 2.4 |
| Combined ammonia feedstock | | | | |
| Mass Flow | kg/hr | 61,117.0 | 150.7 | 191.0 |
| Volume Flow | m$^3$/hr | 6,282.7 | 153.7 | 195.5 |
| H/N Molar ratio | | 2.92 | 3.00 | 3.00 |
| O2 import | STPD | | 0.0 | 0.0 |

As shown in Table 1, Control Example 1 processes an overall natural gas feed flow of 25,246.9 kg/hr, and produces 1,436 STPD of ammonia. However, Example 1 can process about 57 vol % more natural gas than the Control Example 1 and produces 50% more ammonia product. Example 2 increased process/compressed air flow 245 vol % greater than in Control Example 1, and thereby process about 119 vol % more natural gas than the Control Example 1 and produces the combined ammonia feedstock 95.5 vol % more than the Control Example 1. An ammonia synthesis unit can, thereby, produce 96% more ammonia product per hour. Further, the modification included in Examples 1 and 2 allows the primary reformer unit to operate at lower temperatures while processing a significantly higher volume of the feed.

As shown in Examples 1 and 2, processing the second syngas through the PSA unit can produce a syngas having a hydrogen to nitrogen molar ratio ("H/N ratio") that is greater than the first syngas treated in the HTSC, LTSC, CO$_2$ removal unit, and methanator. More particularly, Example 1 has a second syngas with an H/N ratio of about 4.35:1 and a first syngas with an H/N ratio of about 2.7:1. Example 2 has a second syngas with an H/N ratio of about 3.84:1 and a first syngas with an H/N ratio of about 2.4:1. Since the ideal ammonia synthesis makeup gas has an 1-1/N ratio of about 3:1, the combination of the first and second stream of syngas will be more desirable than the Control Example 1. The Control Example 1 has a final H/N ratio of about 2.92:1 while both Examples 1 and 2 have a final H/N molar ratio of about 3:1. Notably, the PSA unit of Examples 1 and 2 produces a waste gas with a Btu rating (Example 1, 1,817.4 Btu/lb; Example 2, 1,243.2 Btu/lb). A waste gas is not produced in Control Example 1. Examples 1 and 2 also allow for a lower steam to carbon (S/C) ratio of 3.1. With regard to Example 2, it was both surprising and unexpected to find that this system increased ammonia production by 196%. Ammonia production and oxygen import are expressed in STPD, which is short tons per day (STPD) and equals LB/HR*24/2000.

TABLE 2

| | Units of Measurement | Control Example 1 | Example 3 scheme 1a | Example 4 Scheme 1b |
|---|---|---|---|---|
| Overall S/C | | 3.3 | 3.27 | 3.1 |
| | | Base = 100 | % Base | % Base |
| Ammonia Produced | STPD | 1,436 | 151 | 150 |
| NG Feed Flow | | | | |
| Mass | kg/hr | 25,246.9 | 154 | 158 |
| Volume | m$^3$/hr | 813.6 | 154 | 158 |

TABLE 2-continued

|  | Units of Measurement | Control Example 1 | Example 3 scheme 1a | Example 4 Scheme 1b |
|---|---|---|---|---|
| Total compressed Air flow |  |  |  |  |
| Mass Airflow/total | kg/hr | 64,451.4 | 168 | 181 |
| Volume airflow/total | m$^3$/hr | 2444.7 | 168 | 181 |
| Air Compressor Power | hP | 13,823.9 | 167 | 179 |
| Primary Reformer Mixed Feed |  |  |  |  |
| Mass Flow | kg/hr | 111,485.3 | 124.6 | 122.8 |
| Volume Flow | m$^3$/hr | 6,728.3 | 123.8 | 122.0 |
| KRES Feed Split ratio |  |  | 16.0 | 19.0 |
| Radiant Duty (X) | MMBtu/hr | −280.75 | 114.1 | 102.9 |
| Primary Reformer Outlet |  |  |  |  |
| Temperature | °C. | 797.0 | 770.0 | 750.0 |
| Mass Flow | kg/hr | 111,485.3 | 124.6 | 122.8 |
| Volume Flow | m$^3$/hr | 22,020.1 | 118.8 | 112.7 |
| CH$_4$ Slip | % mol dry | 12.80% | 16.80% | 19.39% |
| Secondary Reformer Outlet |  |  |  |  |
| Flame Temp. | °C. | 1,279.3 |  |  |
| Temperature | °C. | 985.5 | 1056.6 | 1032.7 |
| Mass Flow | kg/hr | 178,754.9 | 114.5 | 143.3 |
| Volume Flow | m$^3$/hr | 36,217.2 | 113.6 | 138.5 |
| CH$_4$ Slip | % mol dry | 0.40% | 0.09% | 0.12% |
| CO Conc. | % mol dry | 12.99% | 12.94% | 12.51% |
| KRES Outlet/WHB Inlet |  |  |  |  |
| Temperature | °C. | 985.5 | 806.2 | 807.2 |
| Mass Flow | kg/hr | 178,754.9 | 133.0 | 161.3 |
| Volume Flow | m$^3$/hr | 36,217.2 | 106.1 | 127.7 |
| HTSC Outlet (Before Flow Split) |  |  |  |  |
| Temperature | °C. | 435.1 | 429.3 | 428.9 |
| Mass Flow | kg/hr | 178,754.9 | 133.0 | 161.3 |
| Volume Flow | m$^3$/hr | 20,976.7 | 129.7 | 155.9 |
| CO Slip | % mol dry | 3.44% | 3.24% | 3.32% |
| New PSA |  |  |  |  |
| Flow Split fraction (of Total flow) to PSA |  |  | 20.0% | 23.0% |
| H/N molar ratio of purified second syngas |  |  | 10.20 | 9.31 |
| PSA Unit Recoveries: |  |  |  |  |
| H$_2$ |  |  | 88.2% | 88.2% |
| N$_2$ |  |  | 22.8% | 22.8% |
| Fuel Balance |  |  |  |  |
| Waste Gas (PSA) fuel LHV | Btu/lb |  | 782.5 | 649.8 |
| Waste Gas Total Energy (Y) | MMBtu/hr |  | 108.0 | 112.1 |
| WG fuel % of Radiant Arch duty (Y/X) | % |  | 33.7% | 38.8% |
| Typical Radiant Efficiency | % |  | 45-52% | 45-52% |
| EXISTING LTSC Outlet |  |  |  |  |
| Temperature | °C. | 231.7 | 223.4 | 224.6 |
| Mass Flow | kg/hr | 180,143.8 | 132.0 | 123.2 |
| Volume Flow | m$^3$/hr | 16,008.4 | 127.8 | 118.6 |
| CO Slip | % mol dry | 0.27% | 0.2% | 0.2% |
| CO$_2$ Absorber Inlet |  |  |  |  |
| Temperature | °C. | 61.7 | 61.7 | 61.7 |
| Mass Flow | kg/hr | 126,803.1 | 134.1 | 128.3 |

TABLE 2-continued

|  | Units of Measurement | Control Example 1 | Example 3 scheme 1a | Example 4 Scheme 1b |
|---|---|---|---|---|
| Volume Flow | m³/hr | 8,085.2 | 130.9 | 123.4 |
| $CO_2$ Conc. | % mol dry | 17.85% | 17.7% | 17.6% |
| $CO_2$ Absorber Outlet |  |  |  |  |
| Temperature | ° C. | 48.3 | 48.3 | 48.3 |
| Mass Flow | kg/hr | 60,768.7 | 139.3 | 136.3 |
| Volume Flow | m³/hr | 6,388.3 | 131.4 | 124.0 |
| Methanator Outlet |  |  |  |  |
| Temperature | ° C. | 28.9 | 28.9 | 28.9 |
| Mass Flow | kg/hr | 60,768.7 | 139.3 | 136.3 |
| Volume Flow | m³/hr | 6,528.1 | 130.7 | 123.4 |
| Stream 1 makeup gas H/N Molar ratio |  | 2.81 | 2.5 | 2.4 |
| Combined ammonia feedstock |  |  |  |  |
| Mass Flow | kg/hr | 61,117.0 | 147.5 | 149.3 |
| Volume Flow | m³/hr | 6,282.7 | 151.6 | 1515 |
| H/N Molar ratio |  | 2.92 | 3.00 | 3.00 |
| O2 import | STPD |  | 0.0 | 0.0 |

Table 2 shows simulated process results for the Base Case and the modification Examples 3 and 4. The system of Example 3 corresponds to the system 200 discussed and described with reference to FIG. 2, The system of Example 4 corresponded to the system 300 as discussed and described with reference to FIG. 3.

Example 3 includes a second secondary reformer and does not include the methanator after the PSA unit, as discussed and described with reference to FIG. 2. In Example 3, the flow stream is instead divided after exiting the primary reformer into a first stream and a second stream. The PSA unit recovers 88.2% of $H_2$ and only 22.8% of $N_2$. As shown in Table 2, 20% of the feed stream existing the primary reformer is proceed in the new second secondary reformer and PSA unit. This second feed stream results in an H/N molar ratio of 10.2:1, which, when combined with the first streams having an H/N molar ratio of 2.5:1, will produce an ammonia synthesis makeup gas having an H/N molar ratio of 3:1.

Example 4 is similar to Example 1 above, but does not include a methanator after the PSA unit. Similar to Examples 1 and 2, the feed stream is divided after the HTSC, where the first stream is process in the existing system to produce a syngas having an H/N molar ratio of 2.4:1, but where the second stream is processed in a PSA unit to produce a syngas having an H/N molar ratio of 9.31:1. The first and second syngas streams can be combined to produce an ammonia synthesis makeup gas with an H/N molar ratio of 3:1. In Example 4, the PSA unit recovers 88.2% of the $H_2$ and only 22.8% of the $N_2$ in the second stream.

TABLE 3

|  | Units of Measurement | Control Example 2 | Example 5 |
|---|---|---|---|
| Overall S/C |  | 3.56 | 3.22 |
|  |  | Base = 100 | % Base |
| Ammonia Produced | STPD | 1,653 | 157% |
| NG Feed Flow |  |  |  |
| Mass | kg/hr | 28,283.3 | 176 |
| Volume | m³/hr |  |  |
| Total compressed Air flow |  |  |  |
| Mass Airflow/total | kg/hr | 70,255.1 | 231 |
| Volume airflow/total | m³/hr |  |  |
| Air Compressor Power | hP | 14,008 | 217 |
| Primary Reformer Mixed Feed |  |  |  |
| Mass Flow | kg/hr | 138,222.3 | 126 |
| Volume Flow | m³/hr |  |  |
| KRES Feed Split ratio |  |  |  |
| Radiant Duty (X) Primary Reformer Outlet | MMBtu/hr | 291 | 103 |
| Temperature | ° C. | 783.9 | 730 |
| Mass Flow | kg/hr | 138,222.7 | 126 |
| Volume Flow | m³/hr |  |  |
| $CH_4$ Slip | % mol dry | 11.51% | 22.14% |
| Secondary Reformer Outlet |  |  |  |
| Flame Temp. | ° C. | 1260.0 | 1407 |
| Temperature | ° C. | 961.1 | 1,016.1 |
| Mass Flow | kg/hr | 209,485.5 | 161% |
| $CH_4$ Slip | % mol dry | 0.31% | 0.10% |
| CO Conc. | % mol dry | 12.38% | 12.11% |
| KRES Outlet/WHB Inlet |  |  |  |
| Temperature | ° C. | 961.1 | 811.7 |
| Mass Flow | kg/hr | 209,485.5 | 184 |
| HTSC Outlet (Before Flow Split) |  |  |  |
| Temperature | ° C. | 412.2 | 433.3 |
| Mass Flow | kg/hr | 209,485.5 | 184 |
| CO Slip | % mol dry | 2.29% | 3.10% |
| New PSA |  |  |  |
| Flow Split fraction (of Total flow) to PSA |  |  | 43.5% |

TABLE 3-continued

| | Units of Measurement | Control Example 2 | Example 5 |
|---|---|---|---|
| H/N molar ratio of purified second syngas | | | 6.28 |
| PSA Unit Recoveries: | | | |
| $H_2$ | | | 88.0% |
| $N_2$ | | | 31.0% |
| Fuel Balance | | | |
| Waste Gas (PSA) fuel LHV | Btu/lb | | 802.1 |
| Waste Gas Total Energy (Y) | MMBtu/hr | | 178.4 |
| WG fuel % of Radiant Arch duty (Y/X) | % | | 59.3% |
| Typical Radiant Efficiency | % | | 45-52% |
| EXISTING LTSC Outlet | | | |
| Temperature | °C. | 199.4 | 208.3 |
| Mass Flow | kg/hr | 218,186.5 | 103 |
| Volume Flow | m³/hr | | |
| CO Slip | % mol dry | 0.10% | 0.14% |
| $CO_2$ Absorber Inlet | | | |
| Temperature | °C. | 72.2 | 72.2 |
| Mass Flow | kg/hr | 157,339.9 | 109 |
| Volume Flow | m³/hr | | |
| $CO_2$ Conc. | % mol dry | 18.00% | 17.64% |
| $CO_2$ Absorber Outlet | | | |
| Temperature | °C. | 49.4 | 49.4 |
| Mass Flow | kg/hr | 67,469.1 | 121 |
| Volume Flow | m³/hr | | |
| Methanator Outlet | | | |
| Temperature | °C. | 35.0 | 35.0 |
| Mass Flow | kg/hr | 81,076.9 | 121 |
| Volume Flow | m³/hr | | |
| Stream 1 makeup gas H/N Molar ratio | | 2.98 | 2.13 |
| Combined ammonia feedstock | | | |
| Mass Flow | kg/hr | 29,736.9 | 164 |
| Volume Flow | m³/hr | | |
| H/N Molar ratio | | 2.98 | 3.00 |
| O2 import | STPD | | 0 |

Table 3 shows simulated process results for a Control Example 2 in which, similar to Control Example 1, a hydrocarbon is introduced to a primary reformer, a secondary reformer, and a reforming exchanger to produce a syngas. The syngas in Control Example 2 is then introduced to a HTSC, LTSC, carbon dioxide removal unit, and a methanator to produce an ammonia synthesis makeup gas. Example 5 is a modification to the Control Example 2, which includes a methanator downstream of a PSA unit.

In Example 5, 43.5% of the syngas leaving the HTSC is divided into a second stream that is processed in the PSA unit. The first syngas stream is processed in the existing system to produce an ammonia synthesis makeup gas having an H/N molar ratio of 2.13:1. The second gas stream is processed through a PSA unit to produce a makeup gas having an H/N molar ratio of 6.28:1. The first and second makeup gas streams are combined and have an H/N molar ratio of 3:1.

Example 5 can process the natural gas feed at an increased flow rate of 76% more, which requires a compressed air flow 131% more that the Control Example 2. The combined ammonia synthesis makeup gas has a flow rate 64% higher than the Control Example 2, thereby resulting in an ammonia synthesis unit producing 57% more ammonia product per hour.

Table 4 illustrates the Control Example 3 modified according to embodiments discussed and described herein. Table 4 shows simulated process results for the Control Example 3 in which a hydrocarbon is introduced to a primary reformer, a secondary reformer in the presence of an oxidant or excess process air, and a reforming exchanger to produce a syngas. The syngas in the is then introduced to a HTSC, LTSC, carbon dioxide removal unit, and a nitrogen wash unit to produce an ammonia synthesis makeup gas. Examples 6-9 are modifications to the Control Example 3, which includes an increase in the oxygen import to the secondary reformer, and the addition of a nitrogen wash unit, as discussed and described with referenced to FIG. 4.

Example 6 increases the natural gas feed flow of the Control Example 3 by about 151%, introduces an oxidant to the secondary reformer having an oxygen concentration of about 317 STPD, a nitrogen stream imported to the new nitrogen wash unit having a nitrogen concentration of about 2372 STPD, and a steam to carbon ratio (S/C) in the reformer of about 3.1:1. Example 7 is similar to Example 6, except that the oxygen concentration in the oxidant is increased to about 322 STPD and the S/C is decreased to about 2.9:1. Example 8 is similar to Example 7 except that the S/C is increased to about 3.3:1. Example 9 is similar to Example 8, except that the natural gas feed flow is increased to about 174 vol % of the Control Example 3, the oxidant has an oxygen flow of about 656 STPD and a highly concentrated nitrogen stream. It is also surprising and unexpected to find that the ammonia is produced at a rate of about 150% m³/hr to about 170% m³/hr of Control Example 3 while the flow rate of the system is only increased about 110% to 140% over a system without the ASU and nitrogen wash unit.

TABLE 4

| | Units of Measure | Control Example 3 | Example 6 | Example 7 | Example 8 | Example 9 |
|---|---|---|---|---|---|---|
| Overall S/C | | 3.3 | 3.1 | 2.9 | 3.3 | 3.1 |
| | | Base = 100 | % Base | % Base | % Base | % Base |
| Ammonia Produced | STPD | 1,436 | 150 | 151 | 150 | 168 |
| NG Feed Flow | | | | | | |
| Mass | kg/hr | 25,246.9 | 151 | 153 | 150 | 174 |
| Volume | m³/hr | 813.6 | 151 | 153 | 150 | 174 |
| Mass Airflow/total | kg/hr | 64,451.4 | 85/100 | 85/100 | 85/100 | 49/100 |
| Volume airflow/total | m³/hr | 2444.7 | 85 | 85 | 85 | 49 |

TABLE 4-continued

|  | Units of Measure | Control Example 3 | Example 6 | Example 7 | Example 8 | Example 9 |
|---|---|---|---|---|---|---|
| Air Compressor Power | hP | 13,823.90 | 100 | 100 | 100 | 100 |
| Primary Reformer Mixed Feed | | | | | | |
| Mass Flow | kg/hr | 111,485.3 | 119.5 | 113.4 | 120.2 | 139.0 |
| Volume Flow | m³/hr | 6,728.3 | 118.8 | 111.4 | 119.5 | 139.0 |
| KRES Feed Split ratio | | | 15.1 | 14.8 | 14.2 | 14.2 |
| Radiant Duty (X) | MMBtu/hr | −280.75 | 100.6 | 99.2 | 100.3 | 93.0 |
| Primary Reformer Outlet | | | | | | |
| Temperature | ° C. | 797 | 740 | 745 | 738 | 690 |
| Mass Flow | kg/hr | 111,485.3 | 119.5 | 113.4 | 120.2 | 139.0 |
| Volume Flow | m³/hr | 22,020.1 | 107.7 | 103.7 | 107.9 | 114.0 |
| $CH_4$ Slip | % mol dry | 12.80% | 20.8% | 21.9% | 21.05% | 28.00% |
| Secondary Reformer Outlet | | | | | | |
| Flame Temp. | ° C. | 1,279.3 | 1446.1 | 1473.7 | 1446.5 | 1540.5 |
| Temperature | ° C. | 985.5 | 1014.6 | 1008.2 | 1011.7 | 1014.4 |
| Mass Flow | kg/hr | 178,754.9 | 113.3 | 109.6 | 113.9 | 120.0 |
| Volume Flow | m³/hr | 36,217.2 | 118.1 | 114.8 | 118.4 | 130.0 |
| $CH_4$ Slip | % mol dry | 0.40% | 0.3% | 0.4% | 0.27% | 0.30% |
| CO Conc. | % mol dry | 12.99% | 14.8% | 15.4% | 14.76% | 16.00% |
| KRES Outlet/WHB Inlet | | | | | | |
| Temperature | ° C. | 985.5 | 788.2 | 787.9 | 779.7 | 785 |
| Mass Flow | kg/hr | 178,754.9 | 129.2 | 125.3 | 133.6 | 137.0 |
| Volume Flow | m³/hr | 36,217.2 | 108.6 | 106.0 | 110.8 | 119.0 |
| HTSC Outlet (Before Flow Split) | | | | | | |
| Temperature | ° C. | 435.1 | 432.9 | 435.1 | 430.6 | 435 |
| Mass Flow | kg/hr | 178,754.9 | 129.2 | 125.3 | 133.6 | 137.0 |
| Volume Flow | m³/hr | 20,976.7 | 135.6 | 133.0 | 139.0 | 149.0 |
| CO Slip | % mol dry | 3.44% | 3.9% | 4.3% | 3.60% | 4.10% |
| EXISTING LTSC Outlet | | | | | | |
| Temperature | ° C. | 231.7 | 227.4 | 231.1 | 224.4 | 226.8 |
| Mass Flow | kg/hr | 180,143.8 | 128.2 | 124.4 | 132.5 | 137.0 |
| Volume Flow | m³/hr | 16,008.4 | 133.9 | 132.0 | 136.7 | 146.0 |
| CO Slip | % mol dry | 0.27% | 0.3% | 0.4% | 0.26% | 0.31% |
| $CO_2$ Absorber Inlet | | | | | | |
| Temperature | ° C. | 61.7 | 61.7 | 61.7 | 61.7 | 61.7 |
| Mass Flow | kg/hr | 126,803.1 | 124.4 | 125.1 | 124.4 | 125.0 |
| Volume Flow | m³/hr | 8,085.2 | 134.5 | 135.4 | 134.5 | 142.0 |
| $CO_2$ Conc. | % mol dry | 17.85% | 19.9% | 19.9% | 20.0% | 21.8% |
| $CO_2$ Absorber Outlet | | | | | | |
| Temperature | ° C. | 48.3 | 48.3 | 48.3 | 48.3 | 48.3 |
| Mass Flow | kg/hr | 60,768.7 | 97.2 | 97.4 | 96.4 | 72.0 |
| Volume Flow | m³/hr | 6,388.3 | 131.2 | 132.0 | 131.1 | 135.0 |
| Methanator/NW Outlet | | | | | | |
| Temperature | ° C. | 28.9 | 28.9 | 28.9 | 28.9 | 28.9 |
| Mass Flow | kg/hr | 60,768.7 | 97.2 | 97.4 | 96.4 | 72.0 |
| Volume Flow | m³/hr | 6,528.1 | 131.9 | 132.8 | 131.8 | 136.6 |
| Stream 1 makeup gas H/N Ratio | | 2.81 | 4.9 | 4.9 | 4.9 | 9.4 |
| Combined ammonia feedstock | | | | | | |
| Mass Flow | kg/hr | 61,117.0 | 134.5 | 135.5 | 134.8 | 151.0 |
| Volume Flow | m³/hr | 6,282.7 | 143.0 | 144.1 | 143.4 | 160.0 |
| H/N Ratio | | 2.92 | 3.0 | 3.0 | 3.0 | 3.0 |
| O2 import | STPD | 0 | 317 | 322 | 322 | 656 |
| N2 import | | 0 | 2372 | 2372 | 2372 | Very High |

As shown in Table 4, Control Example 3 provides an ammonia production rate of 1,436 STPD, while Examples 6-9 produces ammonia about 50%, 51%, 50%, and 68% higher than that of the Control Example 3, respectively. Examples 6-9 result in an overall decrease in the total compressed air flow through the system. Regardless, the primary and secondary reformers, reforming exchanger, shift converters, and carbon dioxide removal unit all processed the gas at a rate significantly higher than the Control Example 3. As a result, Examples 6-8 produce the ammonia feedstock about 143 vol % higher than the Control Example 3 for, and about 160 vol % higher in Example 9. The flame temperature in the secondary reformer is more than about 300° C. higher than Control Example 3 and the feed leaving the secondary reformer is at a temperature of about 1,010° C. Despite the increased temperature of the second effluent, the reforming raw syngas leaving the reforming exchanger (KRES) is nearly 350° C. cooler than the raw syngas in the Control Example 3.

Embodiments of the present disclosure further relate to any one or more of the following paragraphs:

1. A method for making ammonia, comprising converting a first syngas comprising carbon dioxide and about 8 mol % to about 20 mol % carbon monoxide to produce a shifted syngas comprising carbon dioxide and about 0.1 mol % to about 1 mol % carbon monoxide: separating at least a portion of the carbon dioxide from the shifted syngas to produce a carbon dioxide-lean syngas; converting at least a portion of the carbon monoxide, carbon dioxide, or both in the carbon dioxide-lean syngas to methane to produce a methanated first syngas having a hydrogen to nitrogen molar ratio of about 1.5:1 to about 3.5:1; separating a second syngas comprising carbon dioxide and about 7 mol % to about 20 mol % carbon monoxide to produce a purified second syngas having a hydrogen to nitrogen molar ratio of about 2:1 to about 50:1 and a waste gas having a carbon monoxide concentration of about 0.2 mol % to about 60 mol %; combining at least a portion of the methanated first syngas and at least a portion of the purified second syngas to produce an ammonia feedstock having a hydrogen to nitrogen molar ratio of about 2.5:1 to about 3.5:1; and reacting at least a portion of the hydrogen and nitrogen in the ammonia feedstock to produce an ammonia product.

2. The method according to paragraph 1, wherein the ammonia feedstock has a carbon monoxide concentration of up to about 0.1 mol %, and a carbon dioxide concentration of up to about 0.1 mol %.

3. The method according to paragraph 1 or 2, further comprising reforming a first hydrocarbon in the presence of steam to produce an effluent; separating the effluent into a first effluent and a second effluent; reforming the first effluent in the presence of an oxidant to produce a reformed effluent; combining the reformed effluent with a second hydrocarbon; reforming the combined reformed effluent and second hydrocarbon to produce the first syngas; and reforming the second effluent to produce the second syngas.

4. The method according to any one of paragraphs 1 to 3, wherein the combined reformed effluent and second hydrocarbon are reformed in a reforming exchanger to produce the first syngas, wherein the first syngas is at a temperature of about 700° C. to about 900° C.

5. The method according to any one of paragraphs 1 to 4, wherein the second syngas is separated in a pressure swing adsorption unit having a typical hydrogen recoveries of about 60% to about 98%.

6. The method according to any one of paragraphs 1 to 5, further comprising reforming a first hydrocarbon in the presence of steam to produce a first effluent; reforming the first effluent in the presence of an oxidant to produce a reformed effluent; combining the reformed effluent with a second hydrocarbon; reforming the combined reformed effluent and second hydrocarbon to produce the first syngas; and separating the syngas into the first syngas and the second syngas.

7. The method according to any one of paragraphs 1 to 6, further comprising converting at least a portion of the carbon monoxide, carbon dioxide, or both contained in the purified second syngas to methane.

8. The method according to any one of paragraphs 1 to 7, further comprising converting at least a portion of the carbon monoxide, carbon dioxide, or both contained in the purified second syngas to methane in a methanator.

9. The method according to any one of paragraphs 1 to 8, wherein the first syngas is at a pressure of about 2,000 kPa to about 5,500 kPa.

10. The method according to any one of paragraphs 1 to 9, further comprising separating a purge gas from the ammonia product and combining the purge gas with the second syngas prior to separating the second syngas.

11. A method for making ammonia, comprising converting a first syngas comprising carbon dioxide and about 8 mol % to about 20 mol % carbon monoxide to produce a shifted syngas comprising carbon dioxide and about 0.1 mol % to about 1 mol % carbon monoxide; separating at least a portion of the carbon dioxide from the shifted syngas to produce a carbon dioxide-lean syngas; converting at least a portion of the carbon monoxide, carbon dioxide, or both in the carbon dioxide-lean syngas to methane to produce a methanated first syngas having a hydrogen to nitrogen molar ratio of about 1.5:1 to about 3.5:1, and a carbon monoxide concentration of up to about 0.05 mol %; separating a second syngas comprising carbon dioxide and about 7 mol % to about 20 mol % carbon monoxide to produce a purified second syngas having a hydrogen to nitrogen molar ratio of about 2:1 to about 50:1 and a waste gas having a carbon monoxide concentration of about 0.2 mol % to about 60 mol %; combining at least a portion of the methanated first syngas and at least a portion of the purified second syngas to produce an ammonia feedstock having a hydrogen to nitrogen molar ratio of about 2.5:1 to about 3.5:1; and reacting at least a portion of the hydrogen and nitrogen in the ammonia feedstock to produce an ammonia product.

12. The method according to paragraph 11, wherein the first syngas has a hydrogen concentration of about 40 mol % to about 65 mol % and wherein the second syngas gas a hydrogen concentration of about 35 mol % to about 65 mol %.

13. The method according to paragraph 11 or 12, wherein the at least a portion of the carbon monoxide present in the first syngas is converted to carbon dioxide in a first high temperature shift converter operated at a temperature of about 320° C. to about 425° C. and wherein the second syngas is separated in a pressure swing adsorption unit at a typical hydrogen recovery of about 70% to about 98%.

14. The method according to any one of paragraphs 11 to 13, wherein the second syngas has a hydrogen concentration of about 35 mol % to about 65 mol %, a carbon monoxide concentration of about 7 mol % to about 20 mol %, and a carbon dioxide concentration of about 4 mol % to about 20 mol %, and wherein the purified second syngas has a hydrogen concentration of about 75 mol % to about 99.5 mol %, a carbon monoxide concentration of 0 mol % to about 0.25 mol %, and a carbon dioxide concentration of up to about 0.25 mol %.

15. A system for producing ammonia, comprising: a shift converter configured to convert at least a portion of the carbon monoxide present in a first syngas to carbon dioxide to produce a shifted syngas comprising carbon dioxide and about 0.1 mol % to about 1 mol % carbon monoxide; a carbon dioxide removal unit configured to separate at least a portion of the carbon dioxide from the shifted syngas to produce a carbon dioxide-lean syngas; a methanator configured to convert at least a portion of the carbon monoxide, carbon dioxide, or both contained in the carbon dioxide-lean syngas to methane to produce a methanated first syngas having a hydrogen to nitrogen molar ratio of about 1.5:1 to about 3.5:1; a pressure swing adsorption unit configured to separate a second syngas to produce a purified second syngas having a hydrogen to nitrogen molar ratio of about 2:1 to about 50:1 and a waste gas having a carbon monoxide concentration of 0.2 mol % to about 60 mol %; a conduit configured to combine at least a portion of the methanated first syngas and at least a portion of the purified second syngas to produce an ammonia feedstock having a hydrogen to nitrogen molar ratio of about 2.5:1 to about 3.5:1; and an ammonia synthesis unit configured to react at least a portion of the hydrogen and nitrogen in the ammonia feedstock to produce an ammonia product.

16. The system according to paragraph 15, further comprising a primary reformer configured to reform a first hydrocarbon to produce a first effluent; a secondary reformer configured to reform the first effluent to produce a reformed effluent; and a reforming exchanger configured to reform the reformed effluent and a second hydrocarbon to produce a syngas, wherein the syngas is separated to produce the first syngas and the second syngas.

17. The system according to paragraph 15 or 16, further comprising a primary reformer configured to reform a first hydrocarbon in the presence of an oxidant to produce a first effluent and a second effluent; a first secondary reformer configured to reform the first effluent to produce a reformed effluent; a reform exchanger configured to reform the reformed effluent and a second hydrocarbon to produce the first syngas; and a second secondary reformer configured to reform the second effluent to produce the second syngas.

18. The system according to any one of paragraphs 15 to 17, wherein the primary reformer is operated at a temperature of about 1,200° C. to about 1,550° C.

19. The system according to any one of paragraphs 15 to 18, further comprising a second gas shift converter configured to convert at least a portion of the carbon monoxide contained in the second syngas to carbon dioxide.

20. The system according to any one of paragraphs 15 to 19, further comprising a second methanator configured to convert at least a portion of the carbon monoxide, carbon dioxide, or both contained in the purified second syngas to methane to produce a methanated second syngas, wherein the methanated second syngas is introduced to the ammonia synthesis unit.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow,

What is claimed is:

1. A method for making ammonia, comprising:
converting a first syngas comprising carbon dioxide and about 8 mol % to about 20 mol % carbon monoxide to produce a shifted syngas comprising carbon dioxide and about 0.1 mol % to about 1 mol % carbon monoxide;
separating at least a portion of the carbon dioxide from the shifted syngas to produce a carbon dioxide-lean syngas;
converting at least a portion of the carbon monoxide, carbon dioxide, or both in the carbon dioxide-lean syngas to methane to produce a methanated first syngas having a hydrogen to nitrogen molar ratio of about 1.5:1 to about 3.5:1;
separating a second syngas comprising carbon dioxide and about 7 mol % to about 20 mol % carbon monoxide to produce a purified second syngas having a hydrogen to nitrogen molar ratio of about 2:1 to about 50:1 and a waste gas having a carbon monoxide concentration of about 0.2 mol % to about 60 mol %;
combining at least a portion of the methanated first syngas and at least a portion of the purified second syngas to produce an ammonia feedstock having a hydrogen to nitrogen molar ratio of about 2.5:1 to about 3.5:1; and
reacting at least a portion of the hydrogen and nitrogen in the ammonia feedstock to produce an ammonia product.

2. The method of claim 1, wherein the ammonia feedstock has a carbon monoxide concentration of up to about 0.1 mol %, and a carbon dioxide concentration of up to about 0.1 mol %.

3. The method of claim 1, further comprising:
reforming a first hydrocarbon in the presence of steam to produce an effluent;
separating the effluent into a first effluent and a second effluent;
reforming the first effluent in the presence of an oxidant to produce a reformed effluent;
combining the reformed effluent with a second hydrocarbon;
reforming the combined reformed effluent and second hydrocarbon to produce the first syngas; and
reforming the second effluent to produce the second syngas.

4. The method of claim 3, wherein the combined reformed effluent and second hydrocarbon are reformed in a reforming exchanger to produce the first syngas, wherein the first syngas is at a temperature of about 700° C. to about 900° C.

5. The method of claim 1, wherein the second syngas is separated in a pressure swing adsorption unit having a typical hydrogen recoveries of about 60% to about 98%.

6. The method of claim 1, further comprising:
reforming a first hydrocarbon in the presence of steam to produce a first effluent;
reforming the first effluent in the presence of an oxidant to produce a reformed effluent;
combining the reformed effluent with a second hydrocarbon;
reforming the combined reformed effluent and second hydrocarbon to produce the first syngas; and
separating the syngas into the first syngas and the second syngas.

7. The method of claim 1, further comprising converting at least a portion of the carbon monoxide, carbon dioxide, or both contained in the purified second syngas to methane.

8. The method of claim 1, further comprising converting at least a portion of the carbon monoxide, carbon dioxide, or both contained in the purified second syngas to methane in a methanator.

9. The method of claim 1, wherein the first syngas is at a pressure of about 2,000 kPa to about 5,500 kPa.

10. The method of claim 1, further comprising:
separating a purge gas from the ammonia product and combining the purge gas with the second syngas prior to separating the second syngas.

11. A method for making ammonia, comprising:
converting a first syngas comprising carbon dioxide and about 8 mol % to about 20 mol % carbon monoxide to produce a shifted syngas comprising carbon dioxide and about 0.1 mol % to about 1 mol % carbon monoxide;
separating at least a portion of the carbon dioxide from the shifted syngas to produce a carbon dioxide-lean syngas;
converting at least a portion of the carbon monoxide, carbon dioxide, or both in the carbon dioxide-lean syngas to methane to produce a methanated first syngas having a hydrogen to nitrogen molar ratio of about 1.5:1 to about 3.5:1, and a carbon monoxide concentration of up to about 0.05 mol %;
separating a second syngas comprising carbon dioxide and about 7 mol % to about 20 mol % carbon monoxide to produce a purified second syngas having a hydrogen to nitrogen molar ratio of about 2:1 to about 50:1 and a waste gas having a carbon monoxide concentration of about 0.2 mol % to about 60 mol %;
combining at least a portion of the methanated first syngas and at least a portion of the purified second syngas to produce an ammonia feedstock having a hydrogen to nitrogen molar ratio of about 2.5:1 to about 3.5:1; and
reacting at least a portion of the hydrogen and nitrogen in the ammonia feedstock to produce an ammonia product.

12. The method of claim 11, wherein the first syngas has a hydrogen concentration of about 40 mol % to about 65 mol % and wherein the second syngas gas a hydrogen concentration of about 35 mol % to about 65 mol %.

13. The method of claim 11, wherein the at least a portion of the carbon monoxide present in the first syngas is converted to carbon dioxide in a first high temperature shift converter operated at a temperature of about 320° C. to about 425° C. and wherein the second syngas is separated in a pressure swing adsorption unit at a typical hydrogen recovery of about 70% to about 98%.

14. The method of claim 11, wherein the second syngas has a hydrogen concentration of about 35 mol % to about 65 mol %, a carbon monoxide concentration of about 7 mol % to about 20 mol %, and a carbon dioxide concentration of about 4 mol % to about 20 mol %, and
wherein the purified second syngas has a hydrogen concentration of about 75 mol % to about 99.5 mol %, a carbon monoxide concentration of up to about 0.25 mol %, and a carbon dioxide concentration of up to about 0.25 mol %.

* * * * *